(12) United States Patent
Burns et al.

(10) Patent No.: US 12,540,305 B2
(45) Date of Patent: Feb. 3, 2026

(54) METHOD OF CULTURING ALGAE

(71) Applicant: THE UNIVERSITY OF SHEFFIELD, Sheffield (GB)

(72) Inventors: Thomas James Burns, Sheffield (GB); Daniel James Gilmour, South Ayrshire (GB)

(73) Assignee: THE UNIVERSITY OF SHEFFIELD, Sheffield (GB)

(*) Notice: Subject to any disclaimer, the term of this patent is extended or adjusted under 35 U.S.C. 154(b) by 372 days.

(21) Appl. No.: 17/918,666

(22) PCT Filed: May 10, 2021

(86) PCT No.: PCT/GB2021/051120
§ 371 (c)(1),
(2) Date: Oct. 13, 2022

(87) PCT Pub. No.: WO2021/229209
PCT Pub. Date: Nov. 18, 2021

(65) Prior Publication Data
US 2024/0247226 A1    Jul. 25, 2024

(30) Foreign Application Priority Data
May 11, 2020 (GB) ..................... 2006886

(51) Int. Cl.
| | |
|---|---|
| *C12N 15/70* | (2006.01) |
| *C12M 1/00* | (2006.01) |
| *C12M 1/36* | (2006.01) |
| *C12N 1/12* | (2006.01) |
| *C12R 1/89* | (2006.01) |

(52) U.S. Cl.
CPC ............. *C12N 1/125* (2021.05); *C12M 21/02* (2013.01); *C12M 27/20* (2013.01); *C12M 41/48* (2013.01); *C12R 2001/89* (2021.05)

(58) Field of Classification Search
None
See application file for complete search history.

(56) References Cited

U.S. PATENT DOCUMENTS

| | | |
|---|---|---|
| 11,560,542 B2 | 1/2023 | Cagnac et al. |
| 2018/0271119 A1 | 9/2018 | Cagnac |

FOREIGN PATENT DOCUMENTS

AU    2016364299 A1    6/2018

OTHER PUBLICATIONS

Sloth et al (Enzyme and Microbial Technology vol. 38, Issues 1-2, Jan. 3, 2006, pp. 168-175).*
Schmidt et al (Biotech. Bioengineering. 2005. 90(1): 77-84).*
Gross (Plant and Cell Physiology, vol. 36, Issue 4, Jun. 1995, pp. 633-638).*
Grama et al (ACS Sustainable Chemistry & Engineering. 2016. 4 (3), 1611-1618).*
Šantek, Božidar, et al. "Production of paramylon, a β-1, 3-glucan, by heterotrophic cultivation of Euglena gracilis on a synthetic medium." Engineering in Life Sciences 9.1 (2009): 23-28.
Perez-Garcia, Octavio, and Yoav Bashan. "Microalgal heterotrophic and mixotrophic culturing for bio-refining: from metabolic routes to techno-economics." Algal biorefineries (2015): 61-131.
Graverholt, Olav Sune, and Niels Thomas Eriksen. "Heterotrophic high-cell-density fed-batch and continuous-flow cultures of Galdieria sulphuraria and production of phycocyanin." Applied Microbiology and Biotechnology 77.1 (2007): 69-75.
Graziani, Giulia, et al. "Microalgae as human food: chemical and nutritional characteristics of the thermo-acidophilic microalga Galdieria sulphuraria." Food & function 4.1 (2013): 144-152.
Sarian et al."Effects of Oxygen Limitation on the Biosynthesis of Photo Pigments in the Red Microalgae Galdieria sulphuraria Strain 074G" PLoS ONE 11(2):e0148358 (2016).
Kanesaki, "Diversity and Heavy Metal Tolerance of Unicellular Red Algae Cyanidiales," Frontiers of Plant Science (Biophysical Society of Japan Review) 8C:135-140 (2017).

* cited by examiner

*Primary Examiner* — Jennifer E Graser
(74) *Attorney, Agent, or Firm* — NIXON PEABODY LLP; Seth D. Levy; Nicole D. Kling

(57) ABSTRACT

The present invention relates to a heterotrophic methods of culturing algae, particularly *Galdieria* species, to produce the valuable pigment phycocyanin. The methods rely on high oxygen saturation and controlled base dosing to provide improved phycocyanin production. The present invention further relates to algal biomass, compositions comprising said biomass or phycocyanin, uses thereof in various products, and a reactor for culturing the algae.

18 Claims, 21 Drawing Sheets

METHOD OF CULTURING ALGAE

CROSS-REFERENCE TO RELATED APPLICATIONS

This application is a 35 U.S.C. § 371 National Phase Entry Application of International Application No. PCT/GB2021/051120 filed May 10, 2021, which claims benefit under 35 U.S.C. § 119(a) of GB Application No. 2006886.2 filed May 11, 2020, the contents of which are incorporated herein by reference in their entireties.

FIELD

The present invention relates to a heterotrophic method of culturing algae, in particular for the production of the valuable pigment phycocyanin. The invention further relates to algal biomass produced by the method, the preparation of phycocyanin from said algal biomass, compositions comprising said biomass or phycocyanin, and uses thereof in various products.

The invention further relates to an improved reactor for culturing algae, especially under the conditions of the method.

INTRODUCTION

Phycocyanin is a key protein pigment with a deep blue colour which is used in various industries as a dye and also as a health product. The tertiary structure of phycocyanin is critical to maintaining the colour of its chromophore, phycocyanobilin, ensuring stability of its linearised porphyrin ring form. If denaturing occurs due to exposure to harsh physical conditions, this stability is lost, and phycocyanobilin changes shape becoming an orange colour. This loss of colour leads to product rejection, limited application space and difficulties in manufacturing.

Phycocyanin is currently manufactured using *Arthrospira platensis* (*Spirulina*) under autotrophic methods. However, this requires large open culturing beds which take up a lot of space and which need a constant source of light. These culture conditions are very dependent on seasonal fluctuations, and the culture is liable to contamination with cyanobacteria which produce toxins. Furthermore, *Spirulina* itself has a low biomass productivity and a low phycocyanin productivity. The phycocyanin produced by this organism is also unstable, and can quickly degrade if not maintained under specific conditions to an unusable orange colour as explained above.

*Galdieria sulphuroria* is a red alga that lives in niche acidic and hot environments (e.g. hot springs), growing between pH 0.0-4.0 at temperatures 35-55° C. Additionally, it has been found to metabolise a wide variety of organic carbon substrates in heterotrophic conditions whilst maintaining light harvesting pigments. The light harvesting pigments include those of natural food colouring and biotechnological importance such as phycocyanin. Furthermore, it was found that due to the native environment of *Galdieria sulphuroria*, the phycocyanin it produces is much more stable than that produced by *Spirulina*, and can withstand higher temperatures, acidic pH and harsh chemical treatment. Thus making it far more useful for industrial production processes.

Industrial-academic interest in *Galdieria* was spurred on from a 1995 paper describing a phycocyanin overproducing "mutant" isolated from an originally white strain (074W) observed during long-term routine solid media sub-culturing (Gross and Schnarrenberger, 1995). Of particular importance is the fact that this mutant retained phycocyanin production when grown heterotrophically in the dark. This was unexpected given that phycocyanin is a light harvesting pigment activated by light. Several subsequent studies looked at high-density heterotrophic growth of this *Galdieria* strain in classical stirred tank reactors (Sloth et al., 2006, Graverholt and Eriksen, 2007). It was shown that different heterotrophic substrates induced widely varying levels of phycocyanin production, glucose being the highest, and glycerol producing comparatively poor results.

A key step in the chlorophyll and heme biosynthesis pathway (eventually leading to production of photosynthetic pigments such as phycocyanin) is the enzyme coproporphyrinogen III oxidase (CPO) that catalyses the conversion of coproporphyrinogen III (COPROGEN) to protoporphyrinogen IX (PROTOGEN) (Sarian et al., 2016). It was later discovered that glucose stimulates the production of CPO more than other carbon sources, which correlates with good phycocyanin production when glucose is used as growth substrate. Indeed CPO was shown to have a high requirement for molecular oxygen, as growth under anaerobic conditions led to its expulsion from the cell, thereby halting the phycocyanin synthesis pathway (Sarian et al., 2016). This study went some way to explaining the good phycocyanin production when culturing *Galdieria* on glucose.

Therefore, current attempts to heterotrophically culture *Galdieria* to produce phycocyanin demonstrate a requirement for oxygen and glucose to promote good phycocyanin productivity in the dark, with the highest reported continuous heterotrophic cultivation producing a maximum of 861 mg·L$^{-1}$·day$^{-1}$ phycocyanin at an intracellular concentration of 15.6 mg·g$^{-1}$ dry cell weight using glucose as the carbon source.

These levels are comparatively poor relative to strategies to culture *Galdieria* using the addition of light to induce phycocyanin in a mixotrophic manner. This type of culturing still provides much higher levels of phycocyanin production and is therefore favoured for industrial manufacture. For example, WO2017/050917 describes the use of bursts of red light to stimulate phycocyanin production from *Galdieria* grown on several different organic carbon substrates. The productivity reported is much increased compared to heterotrophic culturing methods, with 29-100 mg·g$^{-1}$ dry cell weight phycocyanin.

The conclusion of these studies is that to produce reasonable quantities of phycocyanin, *Galdieria* algae must be grown on glucose, and/or in the presence of at least some light, especially if a non-glucose carbon source is to be used.

However, large scale algal culture which requires light is expensive, and the use of glucose is also not always economically viable. It would be desirable to be able to produce good levels of phycocyanin from *Galdieria* species in a heterotrophic process that did not require any light, and which could use alternate carbon sources, if desired.

In addition, there are issues with the supply of a nitrogen source during heterotrophic algal culture and with maintaining the desirable pH for the algae to continue producing phycocyanin, especially when trying to use a non-glucose carbon source.

During heterotrophic culture of algae such as *Galdieria sulphuroria*, it is known that there is overall acidification of the medium as the cells grow which correlates with reduced phycocyanin production. It is believed that this is due to the expression of the AMT ammonium uptake transporter which results in a proton being left outside the algal cell as ammonium is deprotonated into ammonia for uptake. Furthermore, in order for phycocyanin production to occur, large amounts of nitrogen are required, typically meaning that large amounts of a nitrogen source such as ammonium sulphate must be dissolved into the medium. This is very difficult to achieve with a glycerol as the carbon source. Glycerol is hygroscopic, removing all non-complexed water from the bulk medium that is required to solvate large amounts of nitrogen sources, making the usual nitrogen sources such as ammonium sulphate insoluble at high concentrations.

Therefore, it would also be desirable to produce good levels of phycocyanin from *Galdieria* species in a heterotrophic process which could use alternate carbon sources and in which high nitrogen levels are maintained without negatively affecting pH.

One or more aspects of the present invention are aimed at solving one or more of the above-mentioned problems.

STATEMENTS OF INVENTION

According to a first aspect of the present invention, there is provided a heterotrophic method of culturing algae comprising:
(a) Growing algae in a medium comprising a carbon source and a nitrogen source, wherein a majority of the carbon source is glycerol and wherein the oxygen saturation of the medium is above 75%.

According to an alternative first aspect of the present invention, there is provided a heterotrophic method of culturing algae comprising:
(a) Growing algae in a medium comprising a carbon source and a nitrogen source, wherein the oxygen saturation of the medium is above 75%.

In one embodiment, the carbon source is selected from: glucose, sucrose, fructose, and glycerol, or any combination thereof. In one embodiment, the majority of the carbon source is glycerol. In one embodiment, glycerol is the sole carbon source. Suitably therefore the carbon source consists of glycerol.

According to a second aspect of the present invention, there is provided a heterotrophic method of culturing algae comprising:
(a) growing algae in an acidic medium comprising a carbon source and a sole nitrogen source, wherein a majority of the carbon source is glycerol; and wherein the sole nitrogen source is a base which is added into the acidic medium during culture and which modifies the pH of the acidic medium.

According to an alternative second aspect of the present invention, there is provided a heterotrophic method of culturing algae comprising:
(a) growing algae in an acidic medium comprising a carbon source and a sole nitrogen source, wherein the sole nitrogen source is a base which is added into the acidic medium during culture and which modifies the pH of the acidic medium.

In one embodiment, the method comprises a prior step of providing an acidic medium comprising algae and a carbon source wherein the acidic medium does not comprise a source of nitrogen. In one embodiment, the method comprises a prior step of providing an acidic medium comprising algae and a carbon source wherein a majority of the carbon source is glycerol, and wherein the acidic medium does not comprise a source of nitrogen. In one embodiment, the method further comprises a prior step of adding the sole source of nitrogen into the acidic medium.

In one embodiment, there is provided a heterotrophic method of culturing algae comprising:
(a) Growing algae in an acidic medium comprising a carbon source and a sole nitrogen source, wherein a majority of the carbon source is glycerol, wherein the oxygen saturation of the acidic medium is above 75%, and wherein the sole nitrogen source is a base which is added into the acidic medium during culture and which modifies the pH of the acidic medium.

In another embodiment, there is provided a heterotrophic method of culturing algae comprising:
(a) Growing algae in an acidic medium comprising a carbon source and a sole nitrogen source, wherein the oxygen saturation of the acidic medium is above 75%, and wherein the sole nitrogen source is a base which is added into the acidic medium during culture and which modifies the pH of the acidic medium.

In one embodiment, the method comprises a prior step of providing an acidic medium comprising algae and a carbon source, wherein the oxygen saturation of the acidic medium is above 75%, and wherein the acidic medium does not comprise a source of nitrogen. In one embodiment, the method comprises a prior step of providing an acidic medium comprising algae and a carbon source, wherein a majority of the carbon source is glycerol, wherein the oxygen saturation of the acidic medium is above 75%, and wherein the acidic medium does not comprise a source of nitrogen. In one embodiment, the method further comprises a prior step of adding the sole source of nitrogen into the acidic medium.

In one embodiment, addition of the base into the acidic medium is automated. Suitably automated by a pH control system as described herein.

According to a third aspect of the present invention, there is provided a method of producing phycocyanin comprising culturing algae according to the first or second aspect.

According to a fourth aspect of the present invention, there is provided algal biomass having a mean intracellular concentration of phycocyanin of at least 25 mg·g$^{-1}$ dry cell weight and a mean intracellular concentration of allophycocyanin of less than 1 mg·g$^{-1}$ dry cell weight.

According to a fifth aspect of the present invention there is provided algal biomass produced by the method of the first or second aspects.

According to a sixth aspect of the present invention, there is provided a method of preparing phycocyanin from the algal biomass of the fourth or fifth aspects.

According to a seventh aspect of the present invention, there is provided a composition comprising the algal biomass of the fourth or fifth aspects.

According to an eighth aspect of the present invention, there is provided a composition comprising phycocyanin derived from the algal biomass of the fourth or fifth aspects, or phycocyanin produced from the method of the sixth aspect.

According to a ninth aspect of the present invention, there is provided a reactor for culturing algae comprising a container for housing a culture medium, wherein the container has a total volume and a working volume, wherein the working volume is a part of the total volume which is operable to contain the culture medium, and wherein the ratio of the total volume: working volume of the container is at least 2:1.

In one embodiment, the reactor comprises an automated pH control system.

In one embodiment, the reactor further comprises at least one pair of baffles.

The present inventors have discovered a novel method of culturing algae, such as *Galdieria sulphuroria*, under heterotrophic conditions to produce good amounts of valuable chemicals, especially photosynthetic pigments such as phycocyanin. The present inventors have discovered that, as well as typical carbon sources, the alternative carbon source of glycerol can be used as a basis for such heterotrophic culture and still provide high productivity as long as high oxygen saturation is maintained in the culture medium.

The inventors have discovered that a high oxygen saturation in the medium solves the problem of a lack of pigment production in the absence of light in heterotrophic cultures.

Without being bound by theory, the inventors believe that an oxygen saturation of at least 75% effectively compensates for the lack of light in heterotrophic culture by providing an alternative source of reactive oxygen species (ROS) to the algae. Such ROS are usually generated as a by-product of photosynthesis under light and stimulate the algae to produce protective pigments such as phycocyanin. In the absence of light, photosynthesis doesn't take place and the pigment production typically falls due to inactivation. However, the provision of high oxygen saturation can mimic the stimulation light usually provides. Furthermore, the high oxygen concentration means that the key enzyme, CPO, is retained within the algal cells and can function effectively to produce these pigments.

The inventors have further found that the effect of high oxygen saturation persists with alternative carbon sources such as glycerol and does not require use of glucose, although glucose can be used to achieve similarly good results.

The method of the invention has a phycocyanin productivity which is 567 times higher compared to existing *Spirulina* autotrophic cultures, and at least 20 times higher phycocyanin productivity compared to existing mixotrophic reactor based-*Spirulina* cultivation.

The method of the invention further improves upon the closest heterotrophic cultures of *Galdieria sulphuroria* in the art. The method of the present invention is able to achieve phycocyanin productivity of over $1.7 \text{ g} \cdot \text{L}^{-1} \cdot \text{day}^{-1}$, compared with a previously reported highest level of $0.86 \text{ g} \cdot \text{L}^{-1} \cdot \text{day}^{1}$ using glucose as a carbon source (Graverholt and Eriksen 2007).

Surprisingly this level of productivity has been achieved by the inventors using a carbon source of glycerol which has often been regarded as a poor substrate compared with glucose.

When using glucose, the method of the present invention is able to achieve an even higher phycocyanin productivity of over $1.75 \text{ g} \cdot \text{L}^{-1} \cdot \text{day}^{-1}$.

The present inventors have further discovered an alternative novel method of culturing algae, such as *Galdieria sulphuroria*, under heterotrophic conditions to produce good amounts of valuable chemicals, especially photosynthetic pigments such as phycocyanin. The inventors have discovered that the alternative carbon source of glycerol can be used as a basis for such heterotrophic culture and still provide high productivity as long as the nitrogen source is added into the culture when required and is not pre-mixed with the glycerol before entry into the bioreactor.

The inventors have discovered that dosing of a basic nitrogen source into the medium during culture solves the problem of typical nitrogen substrates being insoluble when using high concentrations of glycerol and other carbon sources in the initial medium necessary to achieve high biomass concentrations and productivity. The inventors have found that by adding the base when required into the medium during culture, the solubility of the base in the medium is improved because the concentration of the carbon source such as glycerol has fallen due to algae uptake. Furthermore, the addition of the base as needed into the medium keeps up with the nitrogen demand of the growing algae and allows fine-tuning of the nitrogen content of the medium. The inventors have further found that the same basic nitrogen source can also be used to control pH of the medium because it is being added during culture, this prevents growth-mediated drop in pH of the medium leading to a lack of pigment production. Therefore the addition of a single basic source of nitrogen during culture can solve two problems at once; provision of a source of nitrogen for the algae at the high concentrations required in the medium whilst at the same time controlling pH of the medium, without requiring the use of any other source of nitrogen in the medium.

The inventors have found that dosing of the source of nitrogen into the medium during culture can be linked to the pH of the medium and thereby automatically controlled. During algal culture, ammonium (aq) is converted to ammonia gas directly by algal cells via the AMT transporter to allow facilitated diffusion of nitrogen into the cytoplasm, leading to a release of protons into the medium and therefore without an uncontrolled reduction in pH as the cells grow. Via the use of an automated dosing system which detects pH in the medium, a base such as ammonia gas can easily be dosed into the medium when the pH falls too low to maintain a constant pH and also to maintain a high nitrogen concentration in the medium for production of phycocyanin. In addition, the inventors found that the use of ammonia gas in particular is a more reliable way of adding basic nitrogen to the medium without generating high pH localised zones due to poor mixing. Without being bound by theory, the inventors believe that the large surface area of ammonia gas bubbles compared to addition of a liquid nitrogen source allows better mixing. Furthermore, the addition of a gas does not significantly alter the water phase volume of the medium and therefore does not change the concentration of other components in the medium.

The inventors have shown herein that a method of heterotrophic culture of *Galdieria sulphuroria* can be performed and is able to maintain a stable pH and medium nitrogen concentration when using ammonia gas, whilst producing a high of $45 \text{ mg} \cdot \text{g}^{-1}$ dry cell weight of phycocyanin.

Advantageously, both solutions of a high oxygen saturation in the medium and the addition of a sole basic nitrogen source during culture can be used together to provide a much improved method of heterotrophically culturing algae to produce valuable chemicals.

Overall the methods of the invention are an improved heterotrophic method of producing valuable chemicals such as phycocyanin from algae, which are cheaper and more efficient, and which can be viably conducted on an industrial scale.

Features and embodiments of the above aspects are described herein below under headed sections. Any feature or embodiment in any section may be combined with any of the above aspects in any workable combination.

The term 'a' or 'an' as used herein refers to the singular or plural of a feature.

The term 'comprising' as used herein means that the embodiment includes at least the features listed, but may include other features in addition.

The term 'about' as used herein may refer to +/−0% of the value stated, +/−9%, +/−8%, +/−7%, +/−6%, +/−5%, +/−4%, +/−3%, +/−2%, +/−1%, of the value stated, unless otherwise stated.

Description

Oxygen Saturation

The present invention relates to a method of culturing algae to produce the valuable chemical phycocyanin using a medium with a high oxygen saturation level. Suitably the oxygen saturation of the medium is above 75%, above 80%, above 85%, above 90%, above 95%. A typical method for measuring oxygen saturation would be to use a dissolved oxygen probe.

Suitably this would be a polarographic type probe which does not interact with the acidic medium, as traditional galvanic dissolved oxygen probes would degrade in the highly acidic medium. A suitable probe may be for example: a METTLER TOLEDO polarographic DO sensor InPro series of probes or the HI-76407/2 Polarographic Dissolved Oxygen Probe from Hanna Instruments.

Suitably therefore the oxygen saturation of the medium may be 75%, 76%, 77%, 78%, 79%, 80%, 81%, 82%, 83%, 84%, 85%, 86%, 87%, 88%, 89%, 90%, 91%, 92%, 93%, 94%, 95%.

In one embodiment, the oxygen saturation of the medium is about 85%.

Suitably oxygen is dissolved in the medium. Suitably oxygen is dissolved in the medium by aeration of the medium, suitably with pure oxygen. Suitably aeration of the medium may be achieved by bubbling air or pure oxygen through the medium. Suitably aeration of the medium may be achieved by bubbling a mixture of air and pure oxygen through the medium.

Suitably the ratio of air to pure oxygen may be adjusted. Suitably the mixture of air and pure oxygen may comprise between 0-20% pure oxygen, suitably between 0-15% pure oxygen, suitably between 0-10% pure oxygen, suitably between 0-5% pure oxygen. In one embodiment, aeration is achieved by bubbling only air through the medium.

Suitably oxygen or air is bubbled through the medium at a flow rate of between 0.1-5 VVM, suitably between 0.2-4 VVM, suitably between 0.3-3 VVM, suitably between 0.4-2 VVM, suitably between 0.5-1.5 VVM.

Suitably the flow rate of the oxygen or air through the medium may be 0.5, 0.6, 0.7, 0.8, 0.9, 1.0, 1.1, 1.2, 1.3, 1.4, 1.5 VVM.

In one embodiment, oxygen or air is bubbled through the medium at a flow rate of 0.5-1.5 VVM.

Suitably oxygen or air is bubbled through the medium at a flow rate of between 1 to 5 L·min$^{-1}$, suitably between 2 to 4 L·min$^{-1}$, suitably around 3L·min$^{-1}$, for a 3 L working volume bioreactor.

Suitably oxygen or air is bubbled through the medium at a pressure of between 0.5 to 5 bar, suitably between 1 to 3 bar, suitably between 1 to 1.5 bar. Suitably the oxygen or air is bubbled through the medium at a pressure of around 1.5 bar.

Carbon Source

The present invention relates to a method of culturing algae in a medium comprising a carbon source.

Suitably the carbon source is used by the algae to grow. Suitably therefore the carbon source may be known as the carbon substrate. Suitably as the carbon substrate for promoting algal growth.

Suitably the carbon source may be selected from any suitable carbon source which enables the algae to grow. Suitably the carbon source may be selected from a sugar, carbohydrate or polyol. Suitable sugars may include monosaccharides, disaccharides, oligosaccharides, or polysaccharides. Suitable monosaccharides may include glucose, mannose, ribose, xylose, fructose, and galactose. Suitable disaccharides may include sucrose, lactose, isomaltose, trehalose, and maltose. Suitable oligosaccharides may include maltitriose, raffinose, stachyose, verbascose, maltodextrose, and cellodextrose. Suitable polyols may include glycerol, erythritol, inositol, lactitol, mannitol, xorbitol, and xylitol. Suitable carbohydrates may include isomalt, cellulose, hemicellulose, pectin, starch, glycogen, chitin, chitosan, guar gum, beta-glucan, alginate, acacia gum, beta mannan, inulin, tara gum, xanthan gum, carrageenan gum, polydextrose, and glucomannan, or any combination thereof.

Suitably, the carbon source may comprise or consist of any of the sugars, carbohydrates or polyols listed above, in any combination.

In one embodiment the carbon source comprises a sugar. In one embodiment the carbon source is a sugar. In one embodiment the carbon source comprises glucose, or fructose, or sucrose or any combination thereof. In one embodiment the carbon source is selected from glucose, fructose, sucrose or any combination thereof. In another embodiment the carbon source comprises a polyol. In another embodiment the carbon source is a polyol. In one embodiment, the carbon source comprises glycerol. In one embodiment, the carbon source is glycerol as explained below. In one embodiment, the carbon source comprises glucose, fructose, sucrose, or glycerol, or any combination thereof.

Suitably one or more carbon sources may be used in the methods of the invention. In some embodiments, a mixture of carbon sources may be used. In some embodiments, a sole carbon source is used. Suitably references herein to 'the carbon source' may be read as referring to all of 'the carbon sources' which may be present.

For example in one embodiment, a mixture of sugars may be used as the carbon source. In other words, the carbon source may comprise a mixture of sugars. For example a mixture of glucose and fructose may be used as the carbon source. For example a mixture of glucose and sucrose may be used as the carbon source. For example a mixture of fructose and sucrose may be used as the carbon source. For example, a mixture of glucose, fructose and sucrose may be used as the carbon source. Alternatively a mixture of a polyol and a sugar may be used as the carbon source. In other words, the carbon source may comprise a mixture of a polyol and a sugar. Suitably a mixture of glycerol and a sugar may be used as the carbon source. For example a mixture of glycerol and glucose may be used as the carbon source. For example a mixture of glycerol and fructose may be used as the carbon source. For example a mixture of glycerol and sucrose may be used as the carbon source.

In embodiments where a mixture of carbon sources are used, suitably there may be a plurality of carbon sources comprised in the mixture, for example a first carbon source, a second carbon source, a third carbon source etc. Suitably the mixture of carbon sources used may be tailored to the particular algae, or may make use of the available resources. Suitably in some embodiments the carbon source is obtained from waste. Suitably by 'waste' it is meant a by-product or unused product of another process. Suitably such waste may contain a mixture of a plurality of carbon sources. Suitably the waste may comprise a plurality of different carbon sources present at varying amounts. Suitably the carbon sources and amounts thereof contained in the waste may vary depending on the source of the waste.

Suitably the mixture of carbon sources may comprise any combination of carbon sources. For example, in one embodiment, the mixture of carbon sources may comprise 50% of a first carbon source and 50% of a second carbon source. Other proportions are envisaged for example 10:90, 25:75, 33:66, 75:25, 66:33, 90:10 of the first carbon source:second carbon source, or any ratio therebetween. In one embodiment, the mixture of carbon sources may comprise 33% of a first carbon source and 33% of a second carbon source, and 33% of a third carbon source. Other proportions may of course be envisaged.

In one embodiment a sole carbon source is used. Suitably in such an embodiment the sole carbon source is glycerol.

Suitably the or each carbon source may be impure or pure, suitably the purity of the carbon source may be at least 60%, suitably at least 65%, suitably at least 70%, suitably at least 75%, suitably at least 80%, suitably at least 85%, suitably at least 90%, suitably at least 95%, suitably at least 99% pure. Suitably the carbon source is present in the medium at a total concentration of between 10 to 1000 $g \cdot L^{-1}$, suitably at a concentration of 10 $g \cdot L^{-1}$, 20 $g \cdot L^{-1}$, 30 $g \cdot L^{-1}$, 40 $g \cdot L^{-1}$, 50 $g \cdot L^{-1}$, 60 $g \cdot L^{-1}$, 70 $g \cdot L^{-1}$, 80 $g \cdot L^{-1}$, 90 $g \cdot L^{-1}$, 100 $g \cdot L^{-1}$, 110 $g \cdot L^{-1}$, 120 $g \cdot L^{-1}$, 130 $g \cdot L^{-1}$, 140 $g \cdot L^{-1}$, 150 $g \cdot L^{-1}$, 160 $g \cdot L^{1}$, 170 g. $L^{-1}$, 180 g. $L^{-1}$, 190 $g \cdot L^{1}$, 200 $g \cdot L^{-1}$, 210 g. $L^{-1}$, 220 g. $L^{-1}$, 230 $g \cdot L^{-1}$, 240 g. $L^{-1}$, 250 g. $L^{-1}$, 300 $g \cdot L^{1}$, 350 $g \cdot L^{-1}$, 400 $g \cdot L^{-1}$, 450 $g \cdot L^{-1}$, 500 $g \cdot L^{-1}$, 550 $g \cdot L^{-1}$, 600 $g \cdot L^{1}$, 650 $g \cdot L^{1}$, 700 $g \cdot L^{-1}$, 750 $g \cdot L^{-1}$, 800 $g \cdot L^{-1}$, 850 $g \cdot L^{-1}$, 900 $g \cdot L^{-1}$, 950 $g \cdot L^{1}$, 1000 $g \cdot L^{4}$.

Suitably, for continuous cultivation, the total concentration of carbon source in the medium in which the algae are cultivated is close to zero (0-5 $g \cdot L^{-1}$), to prevent inhibition of pigment production.

However, suitably, the carbon source is present in the feed medium at a total concentration of between 50-300 $g^{\cdot L-1}$ Suitably at a total concentration of about 50 $g \cdot L^{-1}$, 60 $g \cdot L^{-1}$, 70 $g \cdot L^{-1}$, 80 $g \cdot L^{-1}$, 90 $g \cdot L^{-1}$, 100 $g \cdot L^{-1}$, 110 $g \cdot L^{-1}$, 120 $g \cdot L^{-1}$, 130 $g \cdot L^{-1}$, 140 $g \cdot L^{-1}$, 150 $g \cdot L^{-1}$, 160 $g \cdot L^{-1}$, 170 $g \cdot L^{-1}$, 180 $g \cdot L^{-1}$, 190 $g \cdot L^{-1}$, 200 $g \cdot L^{-1}$, 210 $g \cdot L^{-1}$, 220 $g \cdot L^{-1}$, 230 $g \cdot L^{-1}$, 240 $g \cdot L^{-1}$, 250 $g \cdot L^{-1}$, 260 $g \cdot L^{-1}$, 270 $g \cdot L^{-1}$, 280 $g \cdot L^{-1}$, 290 $g \cdot L^{-1}$, 300 $g \cdot L^{-1}$. In one embodiment, the carbon source is present in the feed medium at a total concentration of about 200 $g \cdot L^{\sim 1}$. Suitably in this embodiment, the method of the invention is a continuous process.

Suitably, the carbon source is added to the medium at a rate proportional to the concentration of cells, the growth rate, and concentration of the feed medium.

In some embodiments, the carbon source is present in the medium at a total concentration of between 10-30 $g \cdot L^{-1}$. In one embodiment, the carbon source is present in the medium at a total concentration of 20 $g \cdot L^{-1}$. Suitably in this embodiment, the method of the invention is a batch process.

In other embodiments, the carbon source is present in the feed medium at a total concentration of between 400-750 $g \cdot L^{-1}$. In one embodiment, the carbon source is present in the feed medium at a total concentration of 500 $g \cdot L^{-1}$. Suitably in this embodiment, the method of the invention is a semi-continuous process.

Glycerol

The present invention relates to a method of culturing algae in a medium comprising a carbon source, wherein in some embodiments, a majority of the carbon source is glycerol, and in some embodiments the sole carbon source is glycerol.

Suitably the glycerol may be laboratory grade glycerol or may be waste glycerol. Suitably the glycerol may be biodiesel grade glycerol. Suitably the glycerol may be a by-product of an industrial process.

Suitably the glycerol may be impure or pure, suitably the purity of the glycerol may be at least 60%, suitably at least 65%, suitably at least 70%, suitably at least 75%, suitably at least 80%, suitably at least 85%, suitably at least 90%, suitably at least 95%, suitably at least 99% pure.

In one embodiment, the glycerol is waste glycerol. Suitably in such an embodiment, the glycerol has a purity of between about 65-90%.

In one embodiment, the glycerol is laboratory grade. Suitably, in such an embodiment, the glycerol has a purity of at least 95%, suitably at least 99%.

Suitably the carbon source is formed of glycerol and other carbon containing contaminants.

Suitably the carbon source does not comprise any other growth substrate apart from glycerol, such growth substrates may comprise sugars such as glucose. Suitably the carbon source does not comprise glucose.

Suitably a majority of the carbon source means that most of the carbon within the medium is provided by glycerol. Suitably a minority of the carbon source may be provided by contaminants, suitably organic contaminants, suitably carbon containing contaminants.

Suitably a majority of the carbon source is glycerol and a minority of the carbon source is provided by contaminants. Suitably over 50% of the carbon source is glycerol. Suitably over 55%, over 60%, over 65%, over 70%, over 75%, over 80%, over 85%, over 90%, over 95% of the carbon source is glycerol. Suitably less than 45%, 40%, 35%, 30%, 25%, 20%, 15%, 10%, 5% of the carbon source is contaminants. By 'the carbon source' it is meant the total organic substances containing carbon that are in solution within the medium. In one embodiment, at least 90% of the carbon source is glycerol, and up to 10% of the carbon source may be contaminants. In one embodiment, at least 95% of the carbon source is glycerol, and up to 5% of the carbon source may be contaminants. In one embodiment, the carbon source consist substantially of glycerol.

Suitably the carbon source consists of glycerol. Suitably therefore the sole carbon source is glycerol.

Suitably the glycerol is present in the medium at a concentration of between 10 to 1000 $g \cdot L^{-1}$, suitably at a concentration of 10 $g \cdot L^{-1}$, 20 $g \cdot L^{1}$, 30 $g \cdot L^{-1}$, 40 $g \cdot L^{-1}$, 50 $g \cdot L^{1}$, 60 $g \cdot L^{-1}$, 70 $g \cdot L^{-1}$, 80 $g \cdot L^{-1}$, 90 $g \cdot L^{1}$, 100 $g \cdot L^{-1}$, 110 $g \cdot L^{-1}$, 120 $g \cdot L^{-1}$, 130 $g \cdot L^{-1}$, 140 $g \cdot L^{-1}$, 150 $g \cdot L^{1}$, 160 $g \cdot L^{-1}$, 170 $g \cdot L^{-1}$, 180 $g \cdot L^{-1}$, 190 $g \cdot L^{-1}$, 200 $g \cdot L^{-1}$, 210 $g \cdot L^{-1}$, 220 $g \cdot L^{-1}$, 230 $g \cdot L^{-1}$, 240 $g \cdot L^{-1}$, 250 $g \cdot L^{1}$, 300 $g \cdot L^{-1}$, 350 $g \cdot L^{-1}$, 400 $g \cdot L^{-1}$, 450 $g \cdot L^{1}$, 500 $g \cdot L^{-1}$, 550 $g \cdot L^{-1}$, 600 $g \cdot L^{-1}$, 650 $g \cdot L^{-1}$, 700 $g \cdot L^{-1}$, 750 $g \cdot L^{1}$, 800 $g \cdot L^{1}$, 850 $g \cdot L^{-1}$, 900 $g \cdot L^{-1}$, 950 $g \cdot L^{-1}$, 1000 $g \cdot L^{-1}$.

Suitably, for continuous cultivation, the concentration of glycerol in the medium in which the algae are cultivated is close to zero (0-5 $g \cdot L^{-1}$), to prevent inhibition of pigment production.

However, suitably the glycerol is present in the feed medium at a concentration of between 10 to 1000 $g \cdot L^{-1}$, suitably at a concentration of 10 $g \cdot L^{-1}$, 20 $g \cdot L^{-1}$, 30 $g \cdot L^{-1}$, 40 $g \cdot L^{1}$, 50 $g \cdot L^{-1}$, 60 $g \cdot L^{-1}$, 70 $g \cdot L^{-1}$, 80 $g \cdot L^{-1}$, 90 $g \cdot L^{1}$, 100 $g \cdot L^{-1}$, 110 $g \cdot L^{-1}$, 120 $g \cdot L^{1}$, 130 $g \cdot L^{-1}$, 140 $g \cdot L^{1}$, 150 $g \cdot L^{1}$, 160 $g \cdot L^{-1}$, 170 $g \cdot L^{-1}$, 180 $g \cdot L^{1}$, 190 $g \cdot L^{-1}$, 200 $g \cdot L^{-1}$, 210 $g \cdot L^{-1}$, 220 $g \cdot L^{-1}$, 230 $g \cdot L^{-1}$, 240 $g \cdot L^{-1}$, 250 $g \cdot L^{-1}$, 300 $g \cdot L^{-1}$, 350 $g \cdot L^{1}$, 400 $g \cdot L^{-1}$, 450 $g \cdot L^{-1}$, 500 $g \cdot L^{-1}$, 550 $g \cdot L^{1}$, 600 $g \cdot L^{-1}$, 650 $g \cdot L^{-1}$, 700 $g \cdot L^{-1}$, 750 $g \cdot L^{-1}$, 800 $g \cdot L^{1}$, 850 $g \cdot L^{-1}$, 900 $g \cdot L^{1}$, 950 $g \cdot L^{1}$, 1000 $g \cdot L^{-1}$.

In one embodiment, the glycerol is present in the medium at a concentration of between 10-30 $g \cdot L^{-1}$. In one embodiment, the glycerol is present in the medium at a concentration of 20 g·L$^{-1}$. Suitably in this embodiment, the method of the invention is a batch process.

In one embodiment, the glycerol is present in the feed medium at a concentration of between 50-300 g·L$^{-1}$. In one embodiment, the glycerol is present in the feed medium at a concentration of 100 g·L$^{-1}$. Suitably in this embodiment, the method of the invention is a continuous process.

In one embodiment, the glycerol is present in the feed medium at a concentration of between 400-750 g·L$^{-1}$. In one embodiment, the glycerol is present in the feed medium at a concentration of 500 g·L$^{-1}$. Suitably in this embodiment, the method of the invention is a semi-continuous process.

Algae

The present invention relates to a method of culturing algae to produce valuable chemicals such as phycocyanin.

Suitably the algae is a red algae. Suitably the algae is a red algae of the class Cyanidiophyceae, suitably of the order Cyanidiales, suitably of the family Cyanidiaceae or Galdieriaceae, suitably of the genus *Cyanidioschyzon, Cyanidium* or *Galdieria*, suitably of the species *Cyanidioschyzon merolae* 10D, *Cyanidioschyzon merolae* DBV201, *Cyanidium caldarium, Cyanidium daedalum, Cyanidium maximum, Cyanidium partitum, Cyanidium rumpens, Galdieria daedala, Galdieria maxima, Galdieria partita* or *Galdieria sulphuroria*.

Suitably the algae is *Galdieria sulphuroria*.

Suitably the algae is a *Galdieria sulphuroria* strain selected from: ACUF141, SAG 108.79, 074G, 074G-G1, 074G-G2, CCMEE 5587.1, SAG 108.71, and UTEX #2919.

In one embodiment the *Galdieria sulphuroria* strain is ACUF141 (Algal Collection University Federico II).

Suitably the algae is enriched in a valuable chemical. Suitably the algae is enriched in a pigment. Suitably the algae is enriched in a phycobiliprotein and/or a carotenoid. Suitable phycobiliprotein and/or a carotenoids are described hereinbelow. Suitably the algae is enriched in phycocyanin.

Suitably the algae may be a wild type algae or a mutant algae. Suitably the mutant algae may be spontaneously occurring or genetically modified.

Suitably the algae is a spontaneously occurring mutant.

Suitably the algae is highly pigmented. Suitably the highly pigmented algae may be a wild type algae or may comprise a genetic change or mutation. In some embodiments, the algae may comprise an epigenetic change, suitably which causes it to be highly pigmented, suitably by overproduction of phycocyanin. Suitably overproduction of phycocyanin may mean that the algae produces more phycocyanin compared to a wild type algae of the same strain, which is not cultured under the conditions of the methods of the invention.

Suitably the mutant algae has a mutation or genetic change which is advantageous to the production of the valuable chemical. Suitably the mutant algae has a mutation or genetic change which causes overproduction of the valuable chemical. Suitably the algae has a epigenetic change which is advantageous to the production of the valuable chemical. Suitably the algae has an epigenetic change which causes overproduction of the valuable chemical.

Suitably therefore the algae which may be a mutant algae is a phycocyanin overproducer.

Suitably the algae may be a single species of algae or a mixture of different species of algae.

Suitably the algae may be a single strain of algae or a mixture of different strains of algae.

Suitably, the culture method can be used to cultivate a single species of a given genera, several species of a single given genera, or several species of different given genera (at least two species of two different genera).

Suitably, the culture method can be used to cultivate a single strain of a given species, several strains of a single given species, or several strains of different given species (at least two strains of two different species).

In one embodiment, the methods of the invention use a single strain of algae, suitably the algae is *Galdieria sulphuroria* strain ACUF141.

Medium

The present invention relates to a method of heterotrophic culture of algae, wherein the algae is grown in medium.

Suitably the medium which is initially used at the beginning of the culture is a starter medium.

Suitably the starter medium may comprise different components compared to the medium during culture. Suitably once all required components for algal growth are added to the starter medium, the culture begins. Suitably during culture the medium may simply be referred to as 'medium'.

Suitably, in some embodiments of the invention, a starter medium may be provided which does not comprise a nitrogen source. Suitably the nitrogen source is added to the starter medium to begin culture and may be further added during culture as required.

Suitably therefore, the algae is comprised within the medium during culture. Suitably the medium comprises essential nutrients, minerals and the like for the algae to grow. Suitably the medium comprises at least a nitrogen source and a carbon source as defined in the methods of the invention and elsewhere herein. Suitably the medium further comprises a phosphorous source as described elsewhere herein.

Suitably the medium is a heterotrophic medium. Suitably the medium may be any suitable heterotrophic medium known to the skilled person, for example the medium described in Minoda et al. 2004.

Suitably the medium may be an aqueous solution. Suitably the medium may further comprise the addition of salts and minerals such as a magnesium salt, a calcium salt, an iron salt, a boron salt, a manganese salt, a zinc salt, a sodium salt, a cobalt salt and a copper salt. Suitably the medium may further comprise the addition of the following salts and minerals: $MgSO_4$, $CaCl_2$, $FeCl_3$, $H_3BO_3$, $MnCl_2$, $ZnCl_2$, $Na_2MoO_2$, $CoCl_2$, and $CuCl_2$, for example.

Suitably the concentration of a magnesium salt may be (for 10 g of carbon): between 0.3 g·L$^{-1}$ to 0.7 g·L$^{-1}$, between 0.4 g·L$^{-1}$ to 0.6 g·L$^{-1}$, around 0.5 g·L$^{-1}$.

Suitably the concentration of a calcium salt may be (for 10 g of carbon): between 0.03 g·L$^{-1}$ to 0.07 g·L$^{-1}$, between 0.04 g·L$^{-1}$ to 0.06 g·L$^{-1}$, around 0.05 g·L$^{-1}$.

Suitably the concentration of an iron salt may be (for 10 g of carbon): between 0.01 g·L$^{-1}$ and 0.04 g·L$^{-1}$, between 0.015 g·L$^{-1}$ and 0.03 g·L$^{-1}$, between 0.02 g·L$^{-1}$ and 0.03 g·L$^{-1}$, around 0.025 g·L$^{-1}$.

Suitably the medium may comprise the addition of trace elements such as: a boron salt, a manganese salt, a zinc salt, a sodium salt, a cobalt salt and a copper salt. Suitably the concentration of each trace element (for 10 g of carbon) is between 0.01 mg·L$^{-1}$ and 6 mg·L$^{-1}$.

The medium may further comprise chelating agents such as EDTA. Suitably the concentration of EDTA may be (for 10 g of carbon): between 0.005 g·L$^{-1}$ and 0.025 g·L$^{-1}$, between 0.01 g·L$^{-1}$ and 0.02 g·L$^{-1}$, around 0.015 g·L$^{-1}$.

In one embodiment, the concentrations for such salts and minerals may be as follows (for 10 g carbon (g·L$^{-1}$)): $MgSO_4·7H_2O$ 0.5, $CaCl_2·2H_2O$ 0.056, $FeCl_3$ 0.028, and $EDTA.Na_2$ 0.016. In one embodiment, the concentrations for the trace elements are (mg·L$^{-1}$): $H_3BO_3$ 5.72, $MnCl_2·4H_2O$ 3.64, $ZnCl_2$ 0.21, $Na_2MoO_2·2H_2O$ 0.78, $CoCl_2·6H_2O$ 0.08, $CuCl_2$ 0.086.

The medium may further comprise anti-foaming agents, such as Antifoam A (Sigma-Aldrich).

Suitably during culture, the medium may be replaced or added to, suitably using fresh medium. Suitably during continuous processes. Suitably this medium may be termed 'feed' medium. Suitably the feed medium may comprise any of the same components in the same concentrations as the medium described above. However in some instances the feed medium may differ. For example, suitably the feed medium may comprise a higher concentration of carbon source than the culture medium as explained hereinabove.

Method of Culture

The present invention relates to a method of culturing algae.

Suitably the method is heterotrophic. Suitably therefore, the method is performed in the dark. Suitably the method is performed entirely in the dark. Suitably the method is not autotrophic or mixotrophic.

Suitably the method is batch, semi-continuous or continuous. In one embodiment the method is continuous.

Suitably in the case that the method is batch, the method is performed for between 7 to 21 days, suitably between 10 to 19 days, suitably between 14 to 16 days per batch. Suitably the method is batch and is performed for 7, 8, 9, 10, 11, 12, 13, 14, 15, 16, 17, 18, 19, 20, 21 days.

In one embodiment, the method is batch and is performed for 8 days per batch.

Suitably the methods of the invention may comprise further steps in addition to culturing the algae. Suitably such steps may be before or after the culturing steps.

Suitably the methods of the invention may comprise one or more prior steps.

Suitably the methods of the invention may comprise a prior step of (a) providing an acidic medium comprising algae and a carbon source wherein the acidic medium does not comprise a source of nitrogen. Optionally, the oxygen saturation of the medium is at least 75%.

Suitably the methods of the invention may comprise a prior step of (a) providing an acidic medium comprising algae and a carbon source wherein a majority of the carbon source is glycerol, and wherein the acidic medium does not comprise a source of nitrogen. Optionally, the oxygen saturation of the medium is at least 75%.

Suitably in such a step, the acidic medium may be regarded as a starter medium.

Suitably, the method may further comprise a step of adding the sole source of nitrogen into the acidic medium. Suitably into the acidic started medium. Suitably such a step begins the culture by providing the algae with a source of nitrogen to grow. Suitably the sole source of nitrogen is then added into the medium periodically during culture as required.

Suitably the methods of the invention may further comprise one or more subsequent steps.

Suitably the methods of the invention may comprise a step of collecting the algal biomass.

Suitably a step of collecting the algal biomass occurs after the or each culturing step. Suitably the algal biomass is collected from the culture medium. Suitably the algal biomass is collected from the culture medium by any suitable technique such as gravimetric or low-pressure filtration, decantation or precipitation.

Suitably the algal biomass has a high concentration of one or more valuable chemicals, such as phycocyanin as described herein below.

Suitably the algal biomass may be used as is, or further extraction of the valuable chemicals may occur. Suitably the methods of the invention may further comprise a step of extracting valuable chemicals from the algal biomass. Suitably the methods of the invention may further comprise a step of extracting phycocyanin from the algal biomass. Suitable extraction techniques are known in the art, such as cellular lysis. Suitable cellular lysis techniques may include freeze-thaw lysis, high pressure homogenisation, or sonication, for example. Suitably, cellular lysis releases a lysate from the algal cells. Suitably the lysate comprises the valuable chemicals such as phycocyanin.

Suitably the methods of the invention may further comprise a purification step, suitably in which the valuable chemicals are purified. Suitably such a purification step takes place after an extraction step, suitably therefore the valuable chemical is purified from the lysate of the algal cells. Suitably therefore, phycocyanin is purified from the lysate of the algal cells.

Suitable purification techniques are known in the art, such as is commonly found in preparation of *Spirulina* derived phycocyanin. A suitable purification technique may be ammonium sulphate precipitation.

Suitably, the method may therefore comprise the steps of: (i) lysing the algal cells and (ii) purifying a valuable chemical from the lysate.

Suitably the method may therefore comprise the steps of: (i) lysing the algal cells by freeze-thaw lysis, high pressure homogenisation or sonication, and (ii) purifying a valuable chemical from the lysate by ammonium sulphate precipitation.

In one embodiment, the valuable chemical is phycocyanin.

Alternatively, or additionally, the methods of the invention may comprise a step of drying the algal biomass.

Additionally, the methods of the invention may comprise a step of reducing the particle size of the dried algal biomass, suitably this step may occur by milling the dried algal biomass.

Suitably this may produce a flour. Features and uses of such a flour are described elsewhere herein.

In one embodiment, the methods of the invention comprise a step of:
(b) Collecting the algal biomass from the culture medium In one embodiment, the methods of the invention comprise the steps of:
(b) Collecting the algal biomass from the culture medium; and
(c) Extracting one or more valuable chemicals from the algal biomass Suitably the extraction step may comprise one of the techniques described above. Suitably the method may further comprise a purification step as explained above.

In one embodiment, the methods of the invention comprise the steps of:
(b) Collecting the algal biomass from the culture medium; and
(c) Drying the algal biomass In one embodiment, the methods of the invention comprise the steps of:
(b) Collecting the algal biomass from the culture medium;
(c) Drying the algal biomass; and
(d) Milling the dried algal biomass into a flour Nitrogen Source and pH The present invention relates to a method of culturing algae in a medium comprising a nitrogen source.

Suitably the nitrogen source may be present in the starter medium. Alternatively or additionally, the nitrogen source may be added into the medium during culture. In any case, the nitrogen source is required for the algae to grow. Suitably in a first aspect of the invention, the nitrogen source is present in the starter medium, and optionally further nitrogen source may be added during the culture. Suitably in a second aspect of the invention, the nitrogen source is not present in the starter medium, the nitrogen source is added into the medium during culture.

Suitably addition of the nitrogen source into the medium may be referred to as dosing the nitrogen source into the medium.

For example, in one embodiment of the second aspect there is provided a heterotrophic method of culturing algae comprising the steps of:
(a) providing an acidic medium comprising algae and a carbon source, wherein a majority of the carbon source is glycerol, and wherein the acidic medium does not comprise a source of nitrogen;
(b) adding a source of nitrogen into the acidic medium to begin the culture;
(c) further adding the source of nitrogen into the acidic medium during culture as required;
Wherein the source of nitrogen is a base and wherein the base is the sole source of nitrogen for the algae, and the sole source of nitrogen used for controlling pH of the medium.

For example, in one embodiment of the second aspect there is provided a heterotrophic method of culturing algae comprising the steps of:
(a) providing an acidic medium comprising algae and a carbon source, wherein the acidic medium does not comprise a source of nitrogen;
(b) adding a source of nitrogen into the acidic medium to begin the culture;
(c) further adding the source of nitrogen into the acidic medium during culture as required;
Wherein the source of nitrogen is a base and wherein the base is the sole source of nitrogen for the algae, and the sole source of nitrogen used for controlling pH of the medium.

Suitably the culture can only begin once the source of nitrogen is added, because the algae require the source of nitrogen to grow. Suitably therefore, addition of the source of nitrogen allows the algae to grow and controls the beginning of the culture.

Suitably step (b) takes place in a reactor. Suitably therefore the source of nitrogen is added into a reactor comprising the acidic medium. Suitably therefore, step (a) may comprise providing an acidic medium in a reactor.

Suitably the nitrogen source is basic. Suitably the nitrogen source is a base. Suitably the nitrogen source comprises a source of ammonia. Suitably the nitrogen source is selected from ammonia, ammonium hydroxide, ammonium sulphate, and ammonium phosphate. Suitably the nitrogen source may be gas, liquid or solid.

Suitably the nitrogen source is added into the medium during culture. Suitably the nitrogen source is added into the medium when required. Suitably, if a gaseous nitrogen source is used, it is added into the medium by sparging. Suitably an automated pH control system is used to add the nitrogen source into the medium. Suitably the automated system is described elsewhere herein.

Suitably the nitrogen source is added into the medium when the pH of the medium falls. Suitably when the pH of the medium falls below the optimum value for growth of the algae. Suitably such an optimum value is particular to the algae being cultured. In an embodiment where the algae is or comprises *Galdieria sulphuroria*, the optimum pH is about 2. In such an embodiment, suitably the nitrogen source is added into the medium when the pH falls below pH 2. Suitably, as mentioned above, an automated pH control system is configured to measure the pH of the medium and add the nitrogen source into the medium when required. Suitable automated pH control systems are described further hereinbelow.

In some embodiments, suitably the starter medium does not contain a source of nitrogen. Suitably in such an embodiment, an acid is used to replace the source of nitrogen in the starter medium as explained below. Suitably in such embodiments, the starter medium is acidic. Suitably this is an embodiment of the second aspect of the present invention.

Suitably, if gaseous nitrogen source is used, it is added into the culture medium at a flow rate of between 0.1 to 1 L/min, suitably at around 0.5 L/min.

Suitably, if gaseous nitrogen source is used, it is added into the culture medium at a pressure differential compared to air or oxygen supply between 0.5 to 2 bar, suitably around 1 bar.

In one embodiment, the nitrogen source is ammonia gas.

Suitably the ratio of carbon to nitrogen in the medium during culture is controlled. Suitably the ratio of carbon to nitrogen is between 5:1 to 15:1, suitably between 10:1 to 15:1 during culture. In one embodiment, the ratio of carbon to nitrogen is maintained at about 10:1 during culture.

Suitably nitrogen is present in the medium at a concentration of between 0.5-5 $g \cdot L^{-1}$, suitably at a concentration of about 0.5 $g \cdot L^{-1}$, 1 $g \cdot L^{-1}$, 1.5 $g \cdot L^{-1}$, 2 $g \cdot L^{-1}$, 2.5 $g \cdot L^{-1}$, 3 $g \cdot L^{-1}$, 3.5 $g \cdot L^{-1}$, 4 $g \cdot L^{-1}$, 4.5 $g \cdot L^{-1}$, 5 $g \cdot L^{-1}$.

In one embodiment, nitrogen is present in the medium at a concentration of between $0.5^{-1}.0.5$ $g \cdot L^{-1}$. Suitably in such an embodiment, the method is semi-continuous and suitably the nitrogen source is ammonium hydroxide.

In one embodiment, nitrogen is present in the medium at a concentration of between $0.6^{-1}.0.4$ $g \cdot L^{-1}$. Suitably in such an embodiment, the method is semi-continuous and suitably the nitrogen source is ammonia gas.

In one embodiment, nitrogen is present in the medium at a concentration of about 5 $g \cdot L^{-1}$.

Suitably in such an embodiment, the method is continuous, and suitably the nitrogen source is ammonium hydroxide.

In one embodiment, nitrogen is present in the medium at a concentration of 1 $g \cdot L^{-1}$. Suitably in such an embodiment, the method is continuous, and suitably the nitrogen source is ammonia gas.

Suitably the culture medium is maintained at a constant pH.

Suitably the pH of the medium is acidic. Suitably the pH of the medium is between 0-4. Suitably, the pH may be about 0, 1, 2, 3, or 4. In one embodiment, the pH of the medium is 2. Suitably the pH of the acidic starter medium is about pH 2.

Suitably the nitrogen source may also be used to control the pH of the medium. Suitably in addition to providing nitrogen for algal growth. Suitably the nitrogen source is added into the acidic medium during culture and modifies the pH of the acidic medium.

Suitably the nitrogen source is a base. Suitably the base is added into the acidic medium during culture and modifies the pH of the acidic medium.

Suitably the methods of the invention comprise a sole nitrogen source. Suitably the sole nitrogen source may be a base. Suitably the sole nitrogen source fulfils two functions; provides nitrogen for the algae to grow and controls pH of the medium.

Suitably the sole source of nitrogen is a base. Suitably therefore the base is the sole source of nitrogen for the algae, and the sole source of nitrogen used for controlling pH of the medium.

Suitably the methods of the invention do not comprise any other source of nitrogen.

In one embodiment, the sole nitrogen source is ammonia gas. Suitably ammonia gas is the sole source of nitrogen for the algae, and the sole source of nitrogen used for controlling pH of the medium.

Suitably the concentration of the base may be between 1M to 10M, suitably the concentration of the base is 10M.

Suitably an acid may also be added to the medium to control the pH. Suitably any acid may be used. Suitably the acid dissolves in the medium, suitably the acid dissolves in glycerol. Suitably the acid is sulphuric acid.

Suitably the concentration of the acid may be between 1M to 10M, suitably the concentration of the acid is about 5M.

In some embodiments, an acid is added to the medium at the beginning of a culture. Suitably the acid is added to the starter medium. Suitably the acid may be added to replace the nitrogen source. Suitably this embodiment occurs if the nitrogen source is added when required throughout the culture, but is not present in the starter medium at the beginning of the culture. Suitably this occurs in the second aspect of the invention. Suitably in such embodiments, the process is continuous.

Suitably, the concentration of the acid in the starter medium is proportional to the concentration of carbon in the medium with a proportionality comparative to that of nitrogen (i.e. 1:5, 1:10, 1:15 acid:carbon).

Suitably, in an embodiment when the method is continuous, the acid is added at a mole ratio of 1:2 with the source of nitrogen. Suitably, when the source of nitrogen is ammonia or ammonium hydroxide, the acid is added at a mole ratio of 1:2 with the source of nitrogen.

Suitably in an embodiment where the source of nitrogen is ammonium sulphate, no acid is added to the starter medium.

Phosphorous Source

The present invention relates to a method of culturing algae in a medium, suitably the medium may further comprise a source of phosphorous.

Suitably the source of phosphorous assimilable.

Suitable phosphorous sources are selected from: phosphoric acid or phosphorus salts. Suitable phosphorus salts may be selected from: sodium hydrogen phosphate ($Na_2HPO_4$), sodium dihydrogen phosphate ($NaH_2PO_4$), potassium dihydrogen phosphate ($KH_2PO_4$), potassium hydrogen phosphate ($KHPO_4$), or any mixture thereof in any proportion.

In one embodiment, the source of phosphorous is potassium dihydrogen phosphate ($KH_2PO_4$).

Suitably the phosphorous source is present in the medium at a concentration of about 0.3 to 0.7 $g \cdot L^{-1}$ per 10 g of carbon, suitably about 0.4 to 0.6 $g \cdot L^{-1}$ per 10 g of carbon, suitably about 0.5 $g \cdot L^{-1}$ per 10 g of carbon. In one embodiment, the source of phosphorous is present in the medium at a concentration of 0.54 $g \cdot L^{-1}$ per 10 g carbon.

Temperature

The present invention relates to a method of heterotrophically culturing algae in a medium.

Suitably the medium is maintained at a constant temperature. Suitably the medium is maintained at the optimum temperature for culturing the chosen algae.

Suitably the temperature of the medium is warm. Suitably the temperature of the medium is between 35 to 55° C. Suitably the temperature may be about 35, 36, 37, 38, 39, 40, 41, 42, 43, 44, 45, 46, 47, 48, 49, 50, 51, 52, 53, 54, or 55° C. In one embodiment the temperature of the medium is 42° C.

Phycocyanin

The present invention relates to a method of culturing algae to produce a valuable chemical.

The invention also relates to a method of producing phycocyanin by culturing algae.

Suitably the method of the first or second aspects may be used to produce any valuable chemical. Suitably any algae-derived valuable chemical.

Suitably the algae may produce a protein, a lipid, and/or a carbohydrate. Suitably the algae may produce a pigment. Suitably the algae may produce a pigment selected from a phycobiliprotein and/or a carotenoid.

The phycobiliproteins are water-soluble pigments found in the phycobilisome, a photosynthetic complex present in cyanobacteria and certain microalgae. There are three types of phycobiliproteins: phycocyanin, phycoerythrin, allophycocyanin.

Suitably the algae may produce a phycobiliprotein selected from: phycocyanin, phycoerythrin, allophycocyanin, or any combination thereof.

The term carotenoid includes the carotenes ($\alpha$, $\beta$, $\epsilon$, $\gamma$, $\delta$ and $\zeta$-carotene, lycopene and phytoene) and the xanthophylls (astaxanthin, antheraxanthin, citranaxanthin, cryptoxanthin, canthaxanthin, diadinoxanthin, diatoxanthin, flavoxanthin, fucoxanthin, lutein, neoxanthin, rhodoxanthin, rubixanthin, siphonaxanthin, violaxanthin, zeaxanthin). The carotenoids are liposoluble pigments, suitably they have an orange and yellow colour.

Suitably the algae may produce a carotenoid selected from: a carotene, a xanthophyll, or a combination thereof. Suitably the algae may produce a carotene selected from: $\alpha$, $\beta$, $\epsilon$, $\gamma$, $\delta$, $\zeta$-carotene, lycopene and phytoene, or any combination thereof. Suitably the algae may produce a xanthophyll selected from: astaxanthin, antheraxanthin, citranaxanthin, cryptoxanthin, canthaxanthin, diadinoxanthin, diatoxanthin, flavoxanthin, fucoxanthin, lutein, neoxanthin, rhodoxanthin, rubixanthin, siphonaxanthin, violaxanthin and zeaxanthin, or any combination thereof.

Suitably the algae may produce one valuable chemical, or suitably more than one type of valuable chemical. Suitably the algae may produce a mixture of valuable chemicals. Suitably the algae may produce phycocyanin, floridoside and glycogen.

In one embodiment, the algae produce phycocyanin.

In one embodiment, the method of the invention is a method of culturing algae to produce phycocyanin.

Suitably floridoside and/or glycogen may also be produced.

Uses

The invention relates to culturing algae to produce a valuable chemical such as phycocyanin.

Suitably such chemicals have a variety of uses, and suitably the algal biomass itself has a variety of uses.

Suitably the algal biomass may be used as a food product or ingredient for humans or animals.

Suitably the algal biomass may be used as a nutritional supplement. Suitably the algal biomass may be used as a protein or fibre supplement. Suitably the algal biomass may also be used in cosmetics or medicines.

In a further aspect, there is provided use of the algal biomass of the invention as a food, cosmetic or medicament.

Suitably algal biomass for use in the food, cosmetic or medical industry may be supplied as a liquid or as a powder.

Suitably the algal biomass may be processed. Suitably the algal biomass may be dried. Suitably the algal biomass may be dried and milled to form a flour. Suitably the flour may have a particle size of between 10 to 100 μm.

In a further aspect of the invention there is provided a flour formed from the algal biomass of the fourth or fifth aspects. Suitably the flour is formed by drying and milling the algal biomass.

Suitably the flour may be used as a food product or ingredient for humans or animals. Suitably the flour may be used as a nutritional supplement. Suitably as a protein or fibre supplement.

Suitably the algal biomass may also be digested. Suitably the algal biomass may be enzymatically digested. Suitably to release algal proteins from association with polysaccharides. Suitably the algal biomass may be enzymatically digested with one or more saccharides. Suitable mixtures of saccharides are available in the art, such as Viscozyme L.

In a further aspect of the invention there is provided an algal protein composition derived from the algal biomass of the fourth or fifth aspects. Suitably the protein composition is derived by enzymatically digesting the algal biomass.

Suitably the algal proteins may be used as a food product or ingredient for humans or animals. Suitably the algal proteins may be used a nutritional supplement.

Suitably phycocyanin produced by the methods of the invention may be used as a food product or ingredient for humans or animals. Suitably the phycocyanin may be used as a nutritional supplement. Suitably the phycocyanin may also be used in cosmetics or medicines.

In a further aspect, there is provided use of the phycocyanin of the invention as a food, cosmetic or medicament.

Suitably phycocyanin for use in the food, cosmetic or medical industry may be supplied as a liquid or as a powder, or in an encapsulated formulation.

In a further aspect of the invention, there is provided a capsule comprising phycocyanin produced by the methods of the invention.

Suitably the capsule may be hard or soft. Suitably the capsule is formed of a digestible material. Any known digestible material may be used, for example: starch, cellulose, gelatin, carrageenan, collagen, hypromellose, pullulan.

Suitably phycocyanin produced by the methods of the invention may be used as a dye. Suitably phycocyanin may be used as a blue dye. Suitably phycocyanin may be used as a natural blue dye. Suitably it may be used as a dye in food products or ingredients. Suitably phycocyanin produced by the methods of the invention may be used as an edible dye. Alternatively, it may be used as a dye in cosmetics or medicines.

According to a further aspect of the invention, there is provided use of the algal biomass or phycocyanin produced by the methods of the invention as a food product, food ingredient, nutritional supplement, cosmetic or medicine.

According to a further aspect of the invention there is provided use of phycocyanin produced by the methods of the invention as a dye.

Suitably the algal biomass of the invention or the phycocyanin produced by the invention may be comprised within a composition, as per the seventh and eighth aspects of the invention. Suitably the compositions thereof may also have a variety of uses, suitably the uses described here also apply to the compositions.

Suitably the compositions may comprise other components and ingredients in addition to the algal biomass or phycocyanin. Suitably the other components and ingredients are those typically contained in a composition for the relevant use, for example as a food product, cosmetic or medicine.

Algal Biomass

The present invention relates to algal biomass having a high intracellular concentration of phycocyanin.

Suitably the algal biomass is produced by culturing algae. Suitably by culturing algae as described hereinabove. Suitably by culturing algae using a method of the invention.

Suitably the algal biomass has a mean intracellular concentration of phycocyanin of at least 25 mg·g$^{-1}$ dry cell weight. Suitably the algal biomass has a mean intracellular concentration of phycocyanin of between 25-50 mg·g$^{-1}$ dry cell weight. Suitably the algal biomass has a mean intracellular concentration of phycocyanin of 25, 26, 27, 28, 29, 30, 31, 32, 33, 34, 35, 36, 37, 38, 39, 40, 41, 42, 43, 44, 45, 46, 47, 48, 49 or 50 mg·g$^{-1}$ dry cell weight. Suitably the amount of phycocyanin per gram of dry cell weight may be referred to as the 'phycocyanin concentration'.

Suitably, in one embodiment, the algal biomass has a mean intracellular concentration of phycocyanin of about 28 mg·g$^{-1}$ dry cell weight. Suitably this algal biomass is produced by continuous culture.

Suitably, in one embodiment, the algal biomass has a mean intracellular concentration of phycocyanin of 45 mg·g$^{-1}$ dry cell weight. Suitably this algal biomass is produced by batch culture or semi-continuous culture.

Suitably the algal biomass has a concentration of allophycocyanin which is reduced in comparison to algal biomass produced by autotrophic or mixotrophic methods. Allophycocyanin is a pigment which is regarded as an impurity in industrial produced phycocyanin because it has a slightly different colour. Food grade phycocyanin obtained from *Spirulina* is ubiquitously contaminated with allophycocyanin, leading to a green tinge in the otherwise blue product. As a protein of with similar size and physical properties to phycocyanin, separation of the two is challenging usually requiring expensive chromatographic techniques. Advantageously, the present heterotrophic culturing methods of the invention produce an algal biomass with an unusually low level of allophycocyanin.

Suitably the algal biomass of the invention has a mean intracellular concentration of allophycocyanin which is less than the mean intracellular concentration of phycocyanin. Suitably the algal biomass has a mean intracellular concentration of phycocyanin of below 1 mg·g$^{-1}$ dry cell weight. Suitably the algal biomass has a mean intracellular concentration of allophycocyanin which is undetectable.

Without being bound by theory, the inventors believe that because phycocyanin and allophycocyanin are typically induced by light, the heterotopic cultivation of the present invention, wherein phycocyanin is instead induced by high oxygen concentrations, provides a purer phycocyanin product after normal extraction techniques.

Suitably the methods of the invention produce algal biomass. Suitably the methods of the invention produce at least 35 g·L$^{-1}$·day$^{-1}$ of algal biomass. Suitably the methods of the invention produce between 35 and 45 g·L$^{-1}$·day$^{-1}$ of algal biomass. Suitably the methods of the invention produce 35, 36, 37, 38, 39, 40, 41, 42, 43, 44, or 45 g·L$^{-1}$·day$^{1}$ of algal biomass. Suitably the amount of algal biomass produced per day may be referred to as the 'biomass productivity'.

Suitably, in one embodiment, the methods of the invention produce around 42 g·L$^{-1}$·day$^{-1}$ of algal biomass.

Suitably the methods of the invention produce phycocyanin. Suitably the methods of the invention produce at least 1 g·L$^{-1}$·day$^1$ of phycocyanin. Suitably the methods of the invention produce between 1-2.5 g·L$^{-1}$·day$^{-1}$ of phycocyanin. Suitably the methods of the invention produce 1, 1.1, 1.2, 1.3, 1.4, 1.5, 1.6, 1.7, 1.8, 1.9, 2.0, 2.1, 2.2, 2.3, 2.4 or 2.5 g·L$^{-1}$·day$^1$ of phycocyanin. Suitably the amount of phycocyanin produced per day may be referred to as the 'phycocyanin productivity'.

Suitably, in one embodiment, the methods of the invention produce at least 1.7 g·L$^{-1}$·day$^1$ of phycocyanin. Suitably, in one embodiment, the methods of the invention produce 1.75 g·L$^{-1}$·day$^{-1}$ of phycocyanin when using glucose as a carbon source. Suitably the methods of the invention produce at least 1.5 g·L$^{-1}$ day$^{-1}$, even when using more challenging carbon sources, such as glycerol.

Suitably the phycocyanin produced by the methods of the invention, and comprised in the algal biomass, is thermostable. Suitably the phycocyanin is thermostable up to 65° C.

Suitably the phycocyanin produced by the methods of the invention, and comprised in the algal biomass, is pH stable. Suitably the phycocyanin is pH stable between pH2-8.

Suitably the algal biomass may further have a high concentration of proteins. Suitably the algal biomass may comprise 26-32% proteins. Suitably such proteins may be used as a food product.

Suitably the algal biomass may further have a high concentration of insoluble carbohydrates. Suitably the algal biomass may comprise 63-78% carbohydrates. Suitably such insoluble carbohydrates may provide fibre when the algal biomass is used as a food product.

Reactor

The present invention relates to a reactor for culturing algae.

Suitably the reactor is for culturing algae to produce a valuable chemical, suitably phycocyanin. Suitably the reactor is for culturing algae which are as defined hereinabove.

Suitably the reactor is for performing a method of the invention. Suitably the reactor is for use in a method of culturing algae of the first or second aspect, or in a method of producing phycocyanin of the third aspect.

Suitably a method of the invention may comprise culturing algae in any suitable bioreactor, such as a flask, fermenter, raceway, open pond or the like. However, suitably the method of the invention is carried out in a reactor of the invention, suitably as defined in the ninth aspect.

Suitably the reactor is an airlift-type reactor.

Suitably the reactor comprises a container. Suitably the container has a total volume. Suitably the total volume of the container may be up to 200L. Suitably the total volume of the container may be 1L, 2.5L, 4L, 5L, 10L, 100L, 200L or any suitable industrial volume.

Suitably the container is formed of plastic, suitably acid-resistant plastic. Suitable plastics may include HDPE, Acrylic, PTFE, PEEK, PVC, and PP.

Suitably the container also has a working volume. Suitably the working volume is a part of the total volume. Suitably the working volume is operable to contain the culture medium. Suitably the working volume is between ¼ and ½ of the total volume of the container. Suitably the working volume is around ⅓ of the total volume of the container.

Suitably the ratio of the total volume:working volume of the container is at least 2:1. Suitably the ratio of the total volume:working volume of the container is at least 3:1 or at least 4:1.

In one embodiment, the ratio of the total volume:working volume is 3:1.

Suitably the volume of the container which is the total volume–the working volume may be defined as the 'headspace'.

Suitably the headspace is between ⅔ and ½ of the total volume of the container. Suitably the headspace is around ⅔ of the total volume of the container.

Suitably the headspace is operable to contain the algal foam. Algal foam is created during culture of the algae, and typically sits atop the culture medium. The algal foam is understood to be important to the stability of the algal culture and needs to be preserved. However currently available reactor designs do not allow for such foam to be accommodated. The inventors found that adapting reactor design to have a large volume available for the foam produced better algal biomass productivity, especially for culture of phycocyanin producing species.

Suitably the container comprises a width and a depth. Suitably the width and/or the depth of the container may be varied depending on the required total volume of the container. Suitably the width and/or depth is varied rather than the height in order to avoid altering the fluid dynamics of the culture medium.

Suitably the depth and/or width may be varied as follows to achieve different volumes:

| Depth (mm) | Min vol (L) | Max vol (L) |
| --- | --- | --- |
| 100 | 96.7 | 132.9 |
| 200 | 193.4 | 265.8 |
| 300 | 290.1 | 398.7 |
| 400 | 386.8 | 531.6 |
| 500 | 483.5 | 664.5 |
| 600 | 580.2 | 797.4 |
| 700 | 676.9 | 930.3 |
| 800 | 773.6 | 1063.2 |
| 900 | 870.3 | 1196.1 |
| 1000 | 967 | 1329 |

Suitably the reactor further comprises a sparger. Suitably the sparger is operable to deliver gas bubbles into the medium within the container. Suitably the sparger may deliver oxygen into the medium and/or a nitrogen source into the medium. Suitably the reactor may comprise a first sparger for delivering oxygen into the medium and a second sparger for delivering a nitrogen source into the medium.

Suitably the container further comprises one or more baffles, suitably at least one pair of baffles. Suitably the reactor comprises two or four baffles. Suitably the baffles are operable to direct flow of the culture medium. Suitably the baffles are located proximal to the base of the container, suitably such that they are submerged within the culture medium in use. Suitably the baffles span across the entire width of the container.

Suitably the baffles have a triangular or hemispherical profile. Suitably the baffles are configured to direct flow of the culture medium. Suitably the baffles are configured to direct flow of bubbles from the or each sparger. Suitably the baffles are configured to direct flow of the culture medium generated by flow of bubbles from the or each sparger.

Currently available reactor design creates a high amount of shear within the culture medium from mixing baffles. The inventors found that by further adapting the reactor design, especially the baffle design that the algal biomass productivity increased.

Suitably the baffle height is proportional to the base of the container in a 1:1 ratio.

Suitably the reactor comprises a pH control system as described below.

Automated pH control

The reactor of the present invention may further comprise an automated system which is operable to control the pH of the culture medium.

Suitably the pH control system is automated. Suitably the pH control system is operable to dose acid or base into the culture medium, suitably at appropriate intervals. Suitably the pH control system may dose the nitrogen source into the culture medium, suitably the nitrogen source is a base as described hereinabove. Suitable nitrogen sources are described hereinabove.

Suitably, the addition of a source of nitrogen into the culture medium is automated. Suitably it is performed by a pH control system. Suitably therefore, in the method of the second aspect, addition of the source nitrogen is performed by a pH control system. Suitably references to dosing a base herein may be considered as references to dosing the nitrogen source into the medium.

Suitably the control system may be operable to dose a liquid base, or a gaseous base into the culture medium, or both.

Suitably, when the base is a liquid, for example ammonium hydroxide, the control system comprises a pump. Suitably the pump is operable to dose the base into the culture medium. Suitably the pump is a peristaltic pump.

Suitably when the base is a gas, for example ammonia gas, the control system comprises a valve. Suitably the valve is operable to dose the base into the culture medium. Suitably the valve is a solenoid valve.

Suitably the automated system comprises a base reservoir. Suitably the base reservoir is operable to store the base. Suitably the base reservoirs are connected to the reactor via pipes.

Suitably a valve or pump for dosing the base is mounted between the respective reservoir and the reactor.

Suitably the automated system comprises a computer which is operable to control dosing of the base into the culture medium. Suitably the computer is operable to control the or each valve or pump. Suitably the computer is operable to open or close the valve. Suitably the computer is operable to turn the or each pump on or off.

Suitably the automated system comprises a pH probe operable to sense the pH of the culture medium and communicate measured pH values to the computer. Suitably the pH probe is operable to be placed into the culture medium. Suitably the pH probe is operable to measure the pH of the culture medium at intervals. Suitably the intervals are at every 10 seconds, at every 5 seconds, every 2 seconds, every second.

Suitably the computer may be pre-set with an optimum pH for the culture medium, for example pH 2. Suitably the computer may be pre-set with threshold maximum and minimum pH values.

Suitably, if the probe measures a pH higher than the optimum value, the computer triggers dosing of acid into the culture medium. Suitably, this occurs if the pH is higher than the optimum value but not higher than the maximum threshold value.

Suitably, if the probe measures a pH lower than the optimum value the computer triggers dosing of base into the culture medium. Suitably this occurs if the pH is lower than the optimum value but not lower than the minimum threshold value.

Suitably the computer calculates the appropriate dose of base to maintain the optimum pH of the culture medium.

Suitably the computer is operable to open a valve or turn on a pump to dose acid or base into the culture medium.

Suitably such a valve or pump is open or on for between 100 ms to 1000 ms, suitably for between 200 ms to 800 ms, suitably for between 400 ms to 600 ms. Suitably the valve or pump is open or on respectively for about 500 ms. Suitably, when the valve is open or the pump is on, a dose of acid or base is released into the culture medium.

Suitably once a dose of acid or base is delivered into the culture medium, there is a timeout period to allow the culture medium toe equilibrate. Suitably during the timeout period, the pH probe does not take any measurements. Suitably the timeout period lasts for between 15 seconds and 45 seconds, suitably between 20 seconds and 40 seconds, suitably between 25 seconds and 35 seconds, suitably around 30 seconds.

Suitably if the measured pH is above or below the threshold values, respectively, the computer may lock the system. For example, for an optimum pH of 2, the threshold maximum pH may be set at around pH 2.2 and the threshold minimum pH may be set at around pH 1.8.

Suitably the computer may lock the automated system for a period of up to 90 minutes, suitably around 60 minutes.

A suitable control system may be the Minifors control system which may be used in conjunction with an Arduino pH controller (Biochemfluidics, UK).

In a further aspect of the invention, there is provided a system comprising a reactor of the ninth aspect of the invention and an automated pH control system, wherein the automated pH control system is operable to control the pH of a culture medium within the reactor.

FIGURES

The invention will now be described with reference to the following figures in which:

FIG. 1 shows *G. sulphuroria* grown in continuous flow conditions at 0.6 $D^{-1}$ with 20 $g·L^{-1}$ glycerol as the growth limiting substrate. Batch phase growth was supported by 10 $g·L^{-1}$ glucose to provide a high starting point of intracellular phycocyanin (circles ●) before initiation of continuous flow at day 4. Oxygen saturation of either 50 or 35% were automatically controlled by the reactors computer system (line). The dry cell weight remained stable throughout the culture during continuous flow at around 10 $g·L^{-1}$ (squares ■).

FIG. 2 (A) shows growth rate of *G. sulphuroria* decreases as impeller velocity increases, Impeller velocity (circles ○, Growth rate ($day^{-1}$), (squares■biomass concentration ($g·L^{-1}$) and (triangles ▲oxygen saturation (%)) and (B) shows reduced growth rate at impeller speeds of above 500 rpm; Growth rates (black circles ●) against impeller velocity taken from several stirred tank bioreactor runs at 42° C. wherein glycerol concentration ranges from 5-15 $g·L^{-1}$. Line represents the regression mean flanked by 95% confidence intervals.

FIG. 3 shows *G. sulphuroria* cultivated in the 4 L airlift bioreactor in fed-batch with 20 $g·L^{-1}$ glycerol as initial substrate and 500 $g·L^{-1}$ glycerol feeding solution initiated at day 3.5. Oxygen (Measured diamonds ◆; Trace information from bioreactor line –) was maintained above 85% throughout the study despite rapid growth and high carbon concentrations. A drop in O2 around day 6 was caused by a build-up of biofilm on the dissolved oxygen probe, which returned to >85% after cleaning. Dry cell weight (squares ■) increased exponentially except for a period of pump blockage at day 6. Intracellular phycocyanin (circles ●) reached 42 mg·g$^{-1}$ following the batch phase and 45 mg·g$^{-1}$ by the end of cultivation. Glycerol (triangles ▲) was maintained close to zero during fed-batch phase.

Figure 5A:
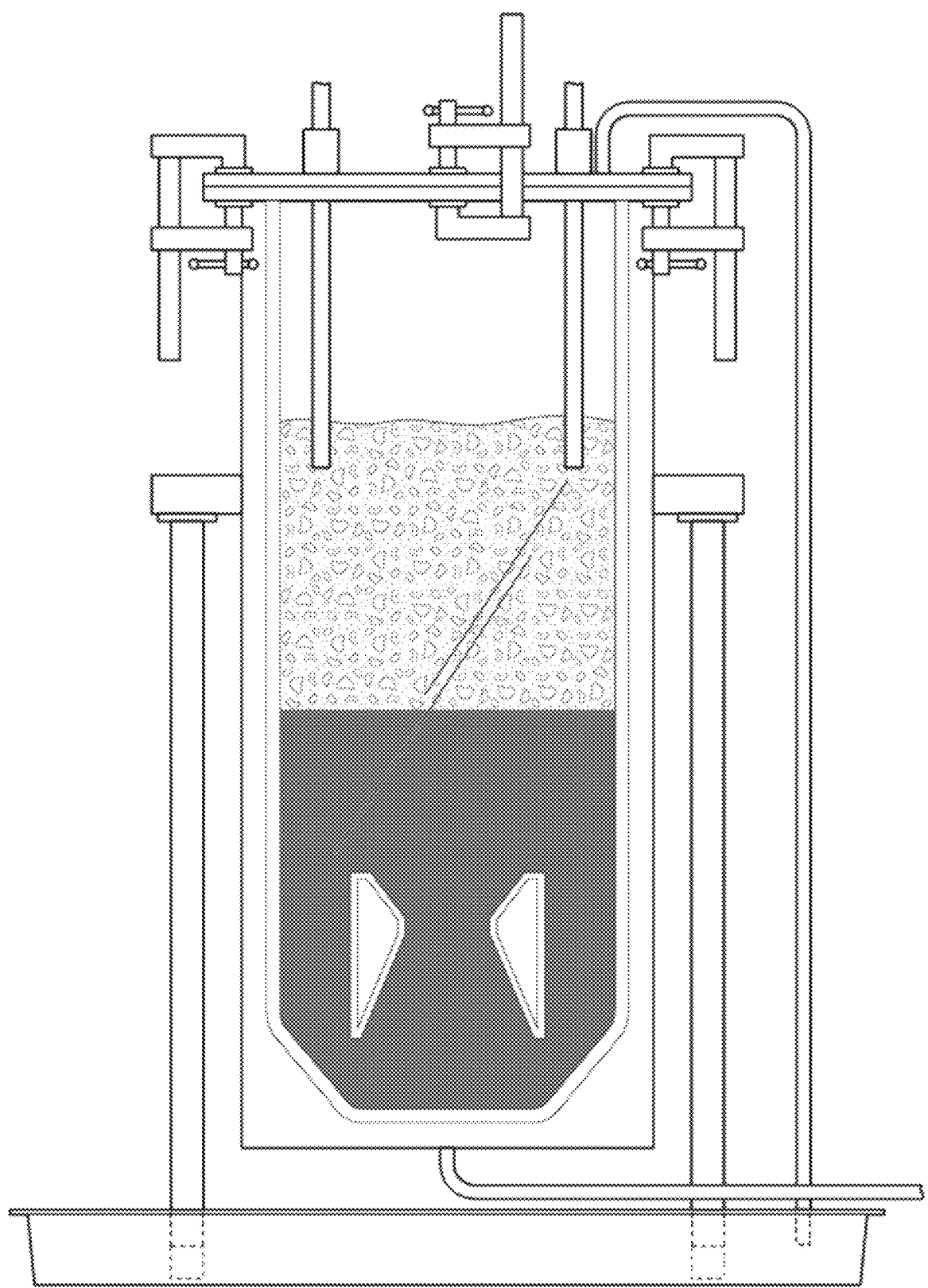
FIG. 5A shows the reactor for culturing algae according to the invention in use during a culture.
Figure 5B:
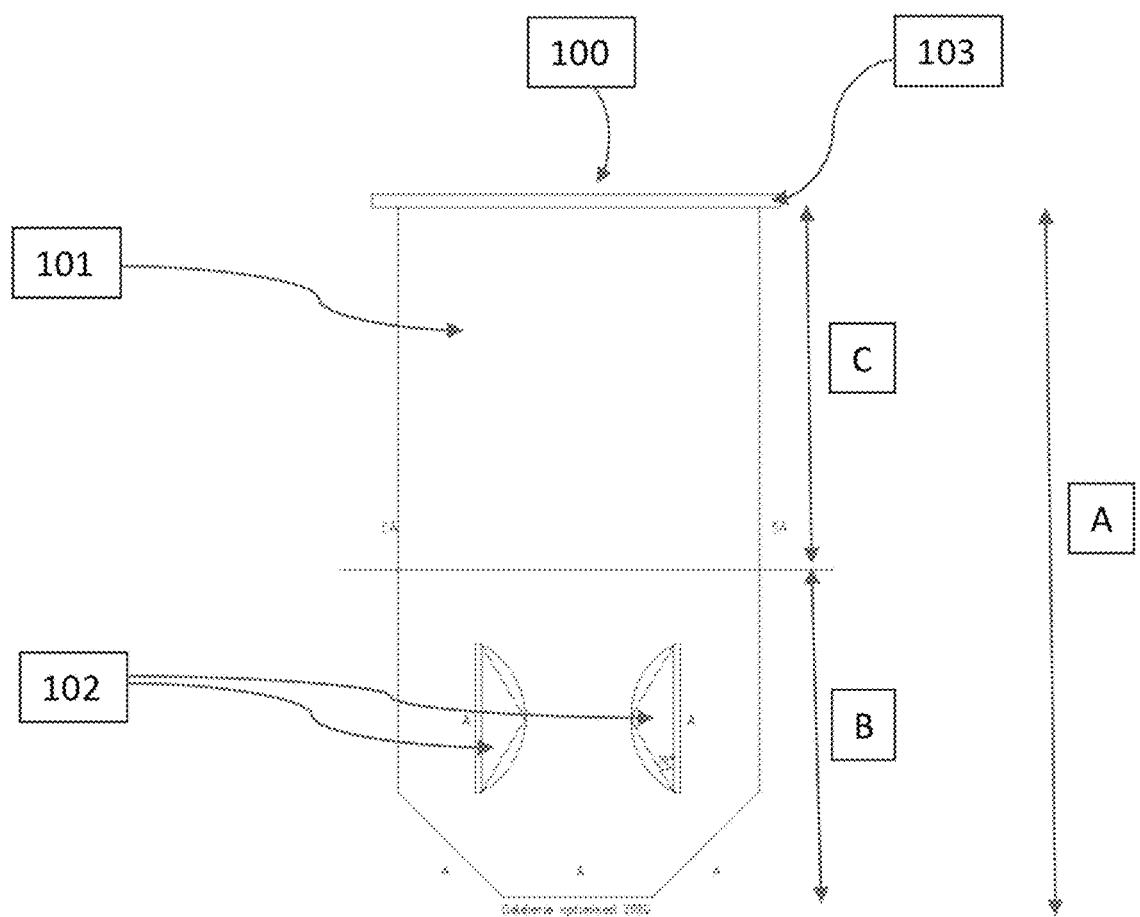

FIG. 5B shows the reactor design according to the invention, the reactor 100 comprises a container 101, with a lid 103, and two triangular profile baffles 102 disposed within the container 101, at the lower end of the container 101, the total volume is indicated by arrow A, and the working volume is indicated by arrow B, arrow C indicates the non-working volume or headspace of the container 101.

Figures 6A, 6B:
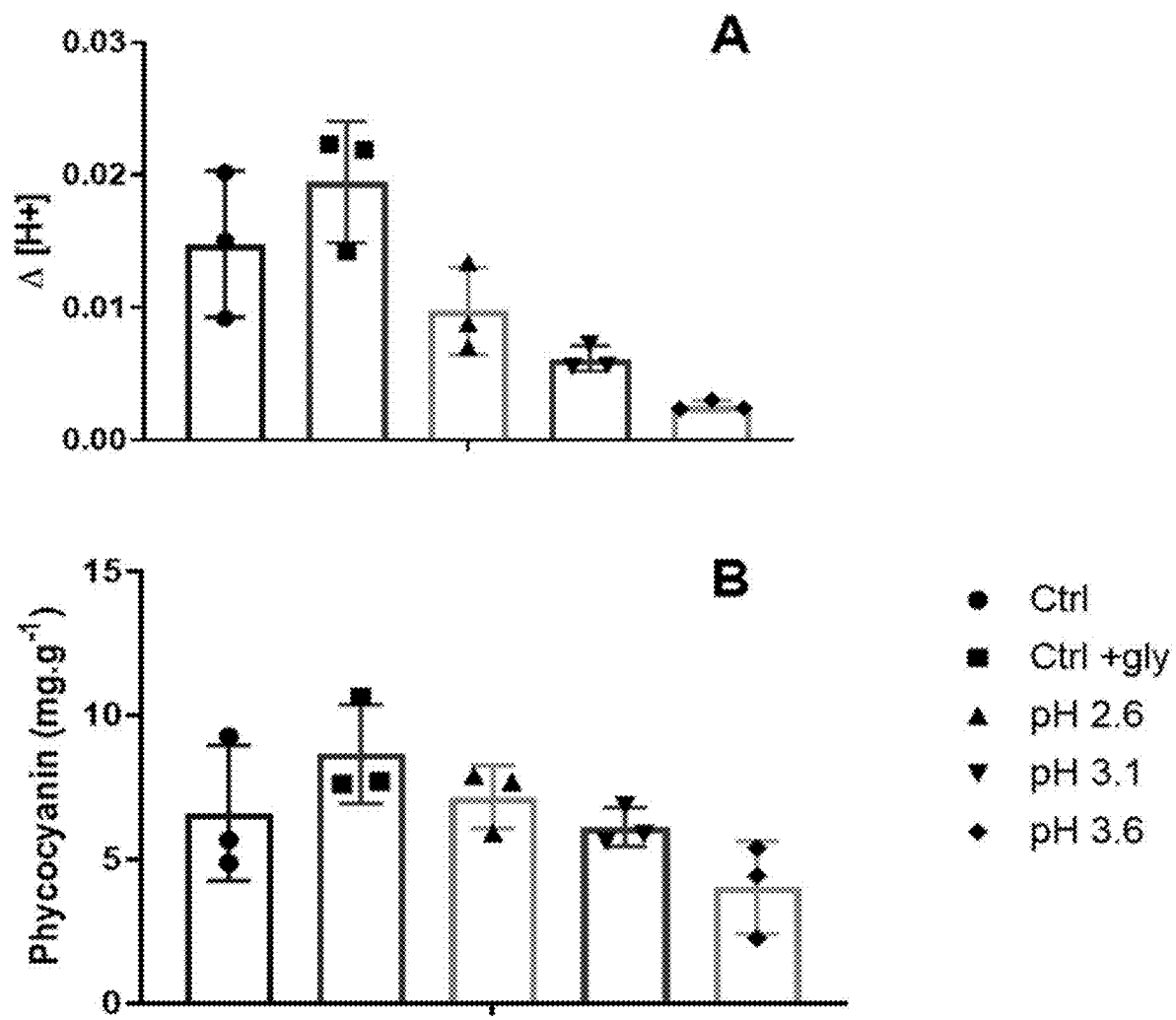

FIG. 6 shows how increased hydrogen ions in culture medium correlate with intracellular phycocyanin concentration, (A) Delta [H*] after 167 hours flask cultivation, with varied starting culture pH. (B) intracellular phycocyanin concentration after 167 hours.

FIG. 7 shows how hydrogen ion release correlates with uptake of $NH_4$ from growth medium, (A) Growth curves of 20 g·L$^{-1}$ glucose flask cultures grown at 42° C. in a shaking water bath. Cultures vary by initial pH. Circles ● are pH 2.0 control medium, squares ■ is control with glycyl-glycine buffer, triangles ▲ is pH 2.6, inverted triangles ▼ is pH 3.1, orange diamonds ♦ is pH 3.6. (B) hydroxyl concentration in the medium as measured by pH probe, reductions infer decreased pH and increased H+ in growth medium. (C) Total concentration of N in the medium as determined by Berthelot reaction.

Figure 8:
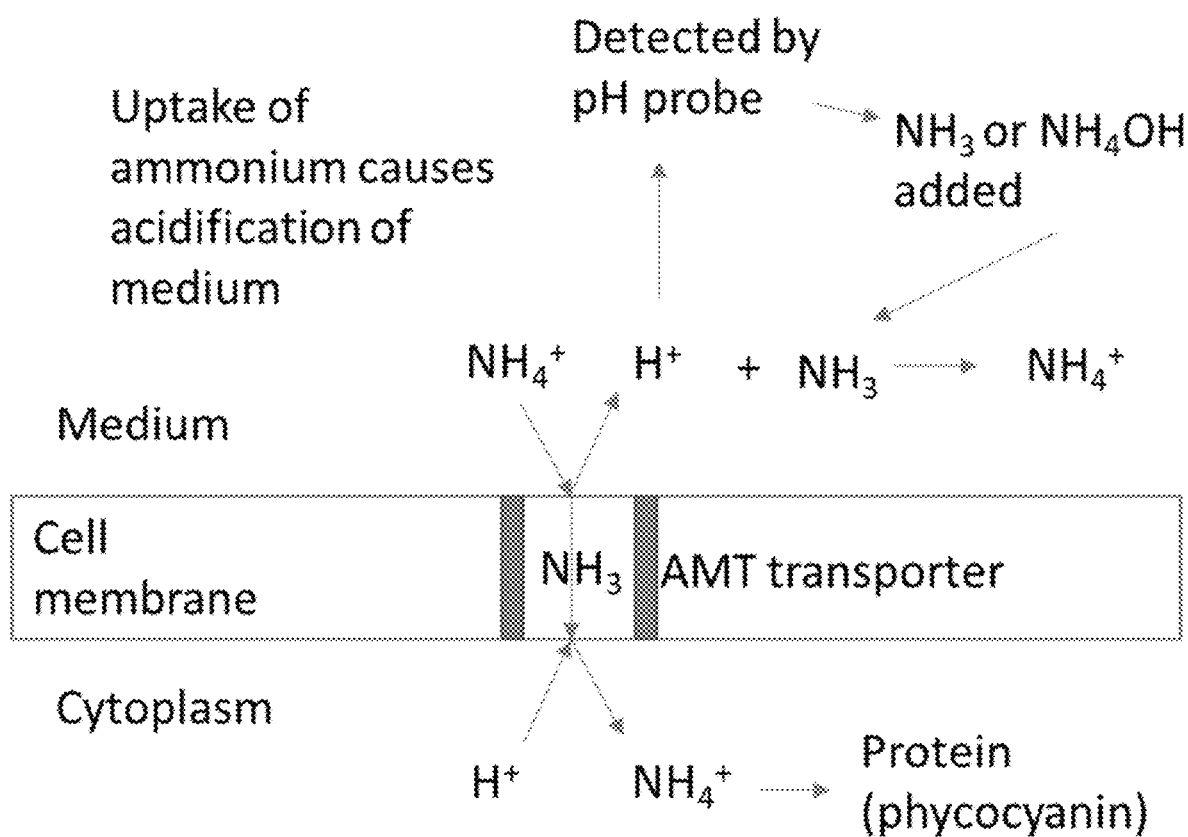

FIG. 8 shows nitrogen uptake at the algal cell membrane and detection by the automatic pH control system; $NH_4^+$ is deprotonated at the extracellular side of the AMT transporter, allowing facilitated diffusion of NH3(g) into the cell. The extracellular proton concentration is detected by pH probe, leading to an automated addition of basic ammonium hydroxide/ammonia gas balancing NH4+ concentration in the medium.

Figures 9A, 9B:
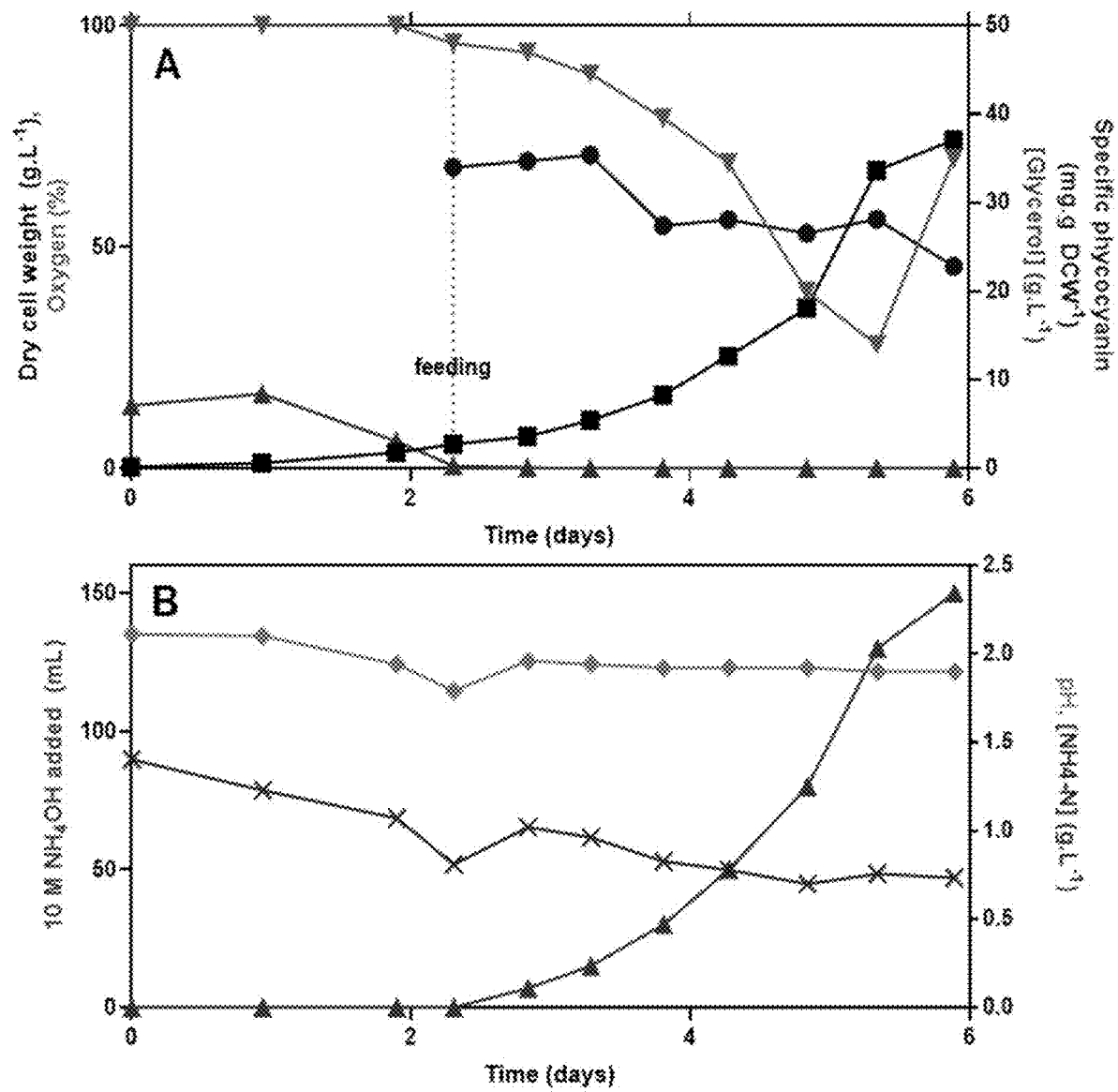

FIG. 9 shows ammonium hydroxide based semi continuous cultivation, (A) Cultivation of Galdieria over 6 days with 500 g·L$^{-1}$ glycerol feeding addition from day 2.3 at 1.0 day$^{-1}$ intended growth rate in the MK 3 airlift bioreactor. Dry cell weight (g·L$^{-1}$) ■; Glycerol concentration (g·L$^{-1}$) ▲; Growth medium oxygen saturation (%) ♦; Specific phycocyanin concentration (mg·g$^{-1}$) ●, (B) Maintenance of medium nitrogen concentration x through pH ♦ control.

Nitrogen maintained between 0.5-1.5 g·L$^{-1}$ throughout the course of the study through the automated addition of 150 mL 10 M NH$_4$OH ▲. The downwards trend of medium nitrogen may be explained by the difference between the feeding solution (pH 2.0) and reactor (pH 1.9).

Figure 10:
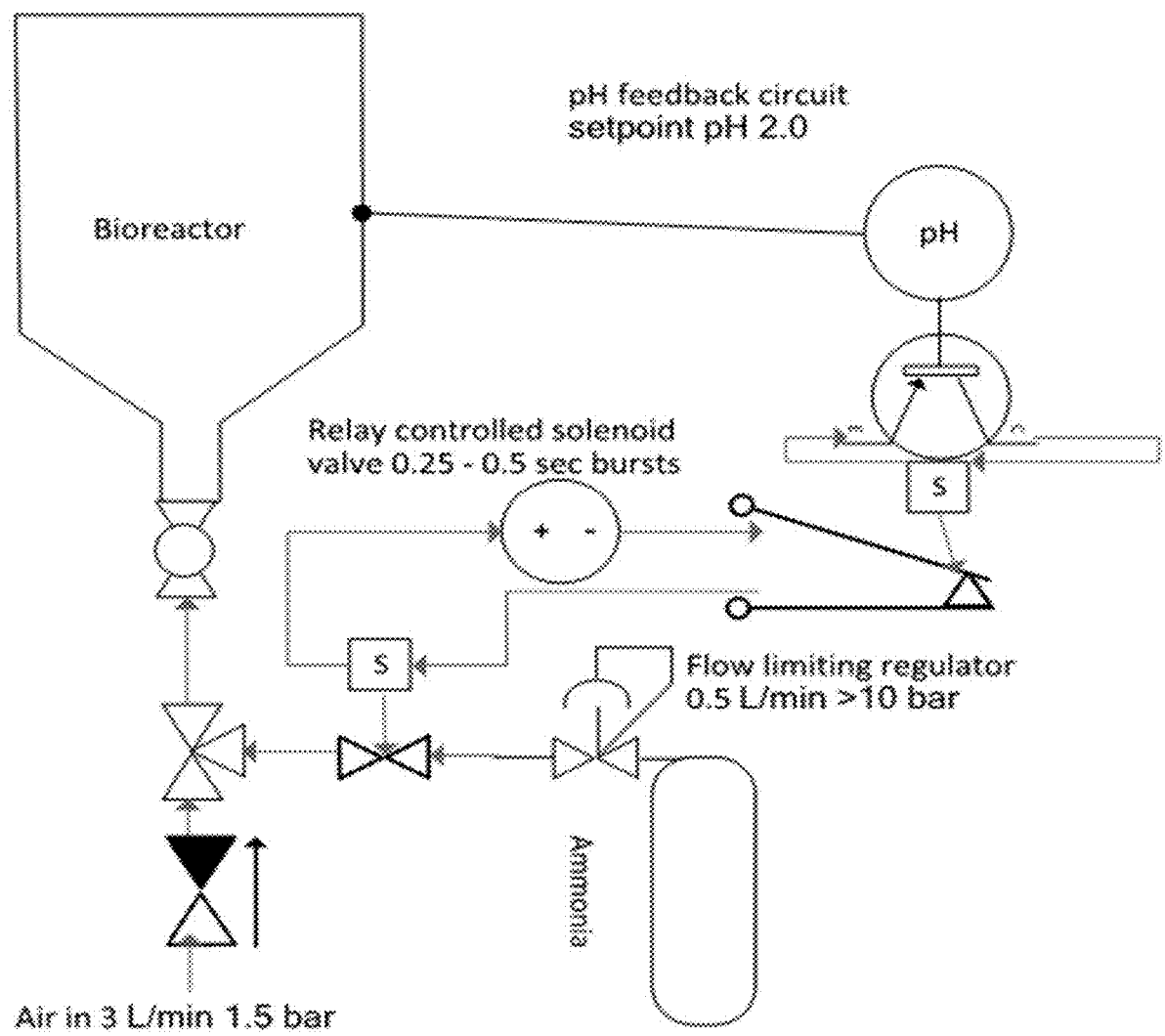

FIG. 10 shows an automatic pH controlled ammonia gas based system at a 3L scale comprising a reactor and an automatic pH control system having a pH probe, an ammonia gas reservoir, and a solenoid valve.

Figure 11:
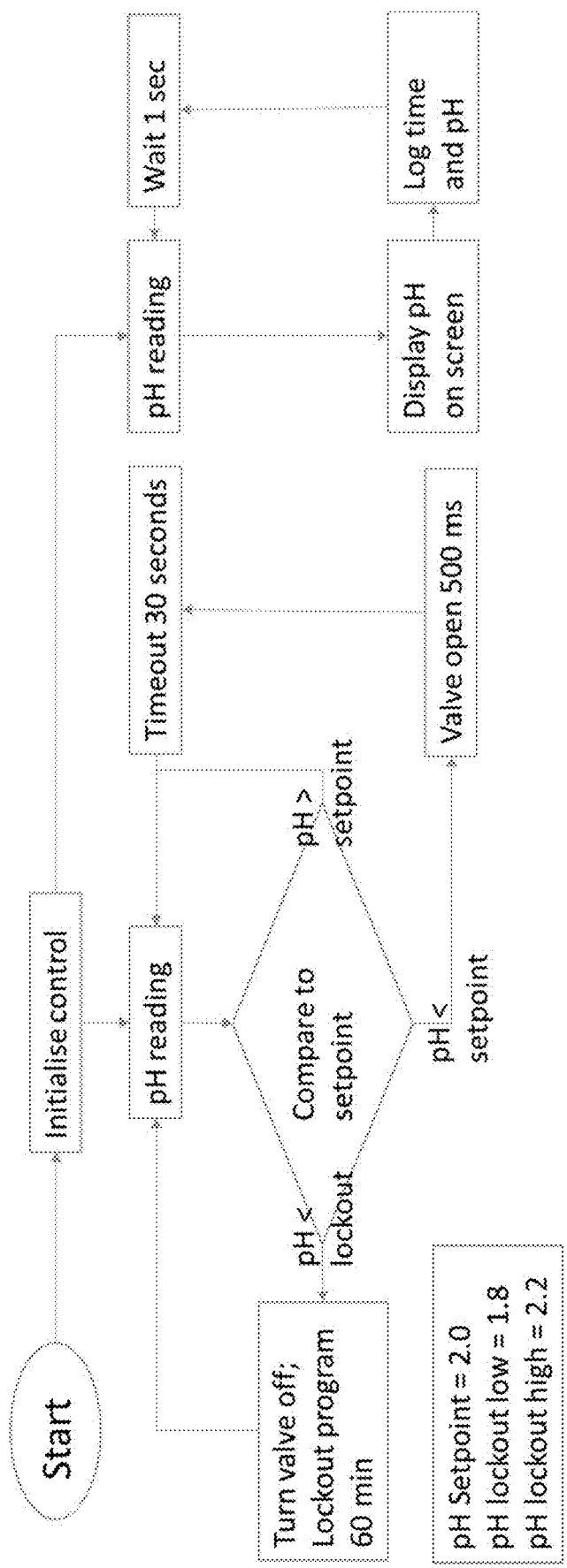

FIG. 11 shows an automatic pH control system feedback loop; pH is continuously monitored by the system and recorded in 1 second intervals. A setpoint is selected, in this case pH 2.0, as well as lockouts either side as a safety feature. If pH is detected below the setpoint, but above the low lockout point, the valve opens and a 30 second timeout occurs in order to allow the pH to equilibrate. If pH is detected above or below the lockout values, a 60 minute lockout occurs. This is to prevent erroneous addition of $NH_3$ in the case of valve failure, probe failure, or disconnect between the reactor and $NH_3$ supply.

Figures 12A, 12B:
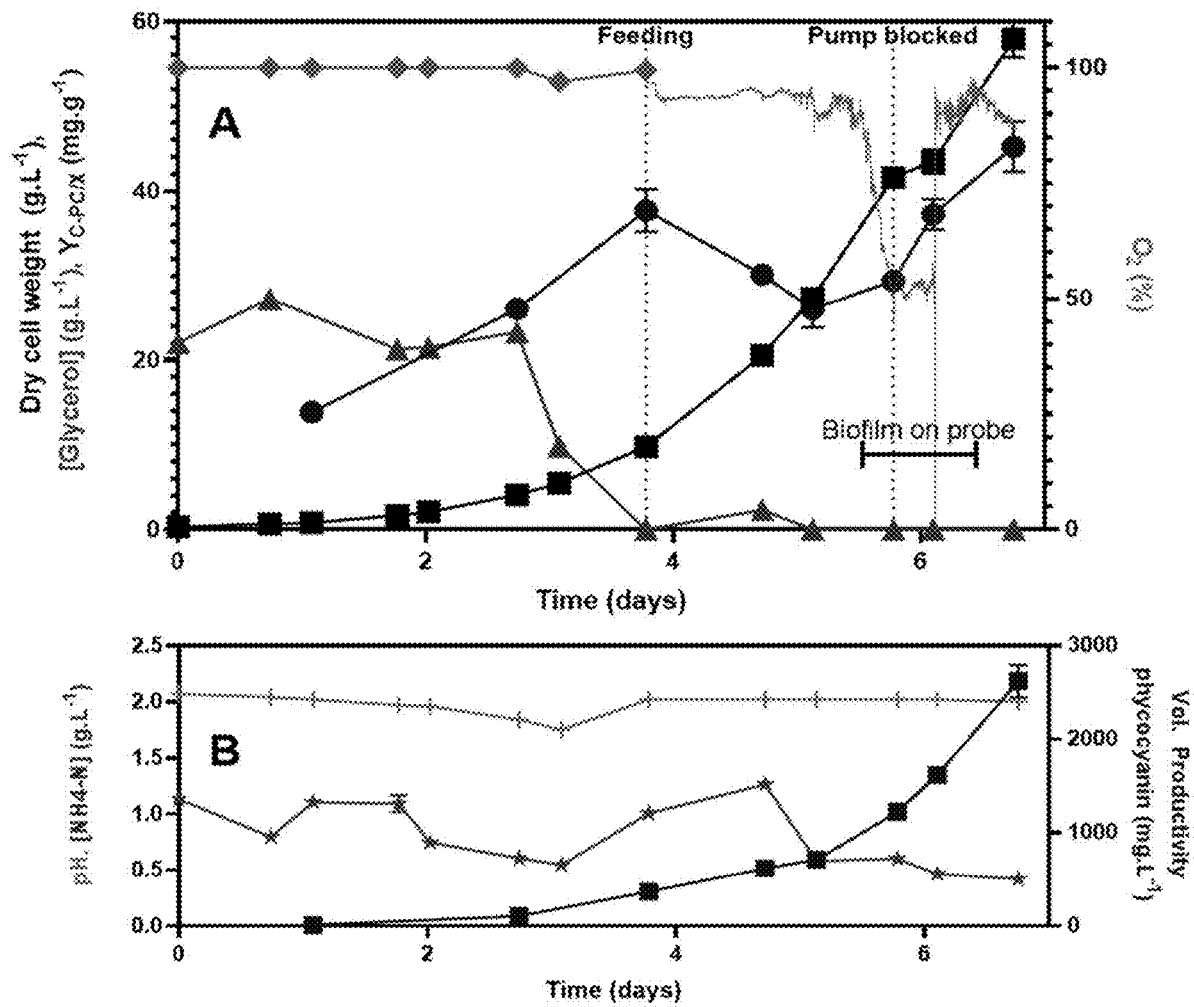

FIG. 12 shows semi-continuous cultivation of Galdieria using automated $NH_3$ gas as a nitrogen source, (A) Cultivation of Galdieria over 7 days with 500 g·L$^{-1}$ glycerol feeding addition from day 3.5 at 1.0 day$^{-1}$ intended growth rate in the MK 4 airlift bioreactor. Dry cell weight (g·L$^{-1}$) ■; Glycerol concentration (g·L$^{-1}$) ▲; Growth medium oxygen saturation (%)+; Specific phycocyanin concentration (mg·g$^{-1}$) ●. Biofilm build-up on dissolved oxygen probe contributed to drop in measured oxygen saturation around day 6, (B) Maintenance of medium nitrogen concentration * through pH+control. Nitrogen maintained between 0.5-1.5 g·L$^{-1}$ throughout the course of the study, despite a total of 43 g $NH_3$ added. Volumetric productivity of phycocyanin (mg·L$^{-1}$) ■ increases exponentially with cell growth.

Figure 13:
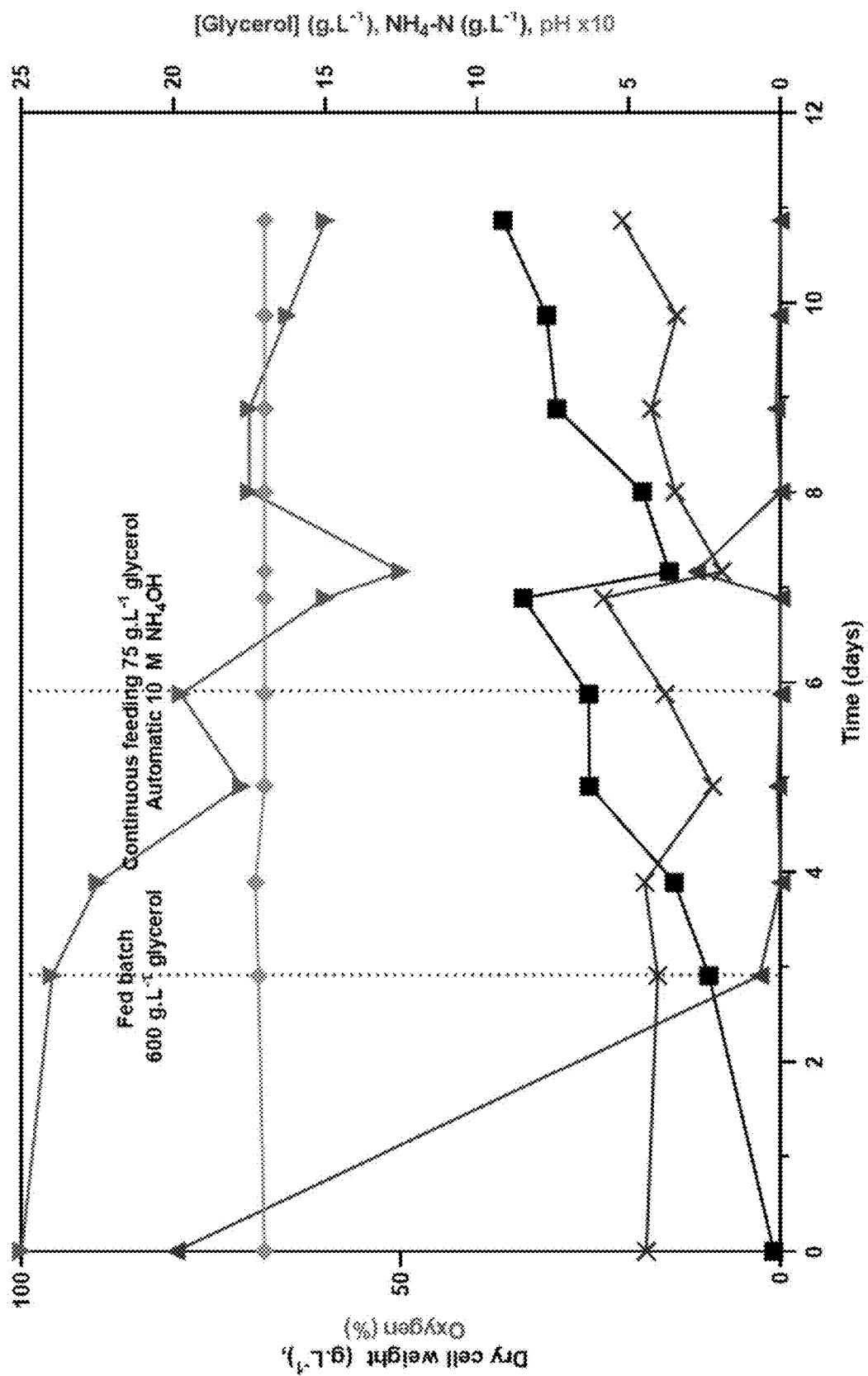

FIG. 13 shows initial continuous glycerol culture with ammonium hydroxide automated nitrogen source; Continuous flow cultivation in the MK 2 airlift bioreactor at 0.5 dilutions per day and 75 g·L$^{-1}$ glycerol preceded by a semi-continuous phase from day 3 to day 6. Nitrogen is added automatically to maintain a pH of 1.7 throughout the study ♦. Dry cell weight (g·L$^{-1}$) ■; Glycerol concentration (g·L$^{-1}$) ▲; Growth medium oxygen saturation (%) ▼; nitrogen concentration x (g·L$^{-1}$).

Figure 14:
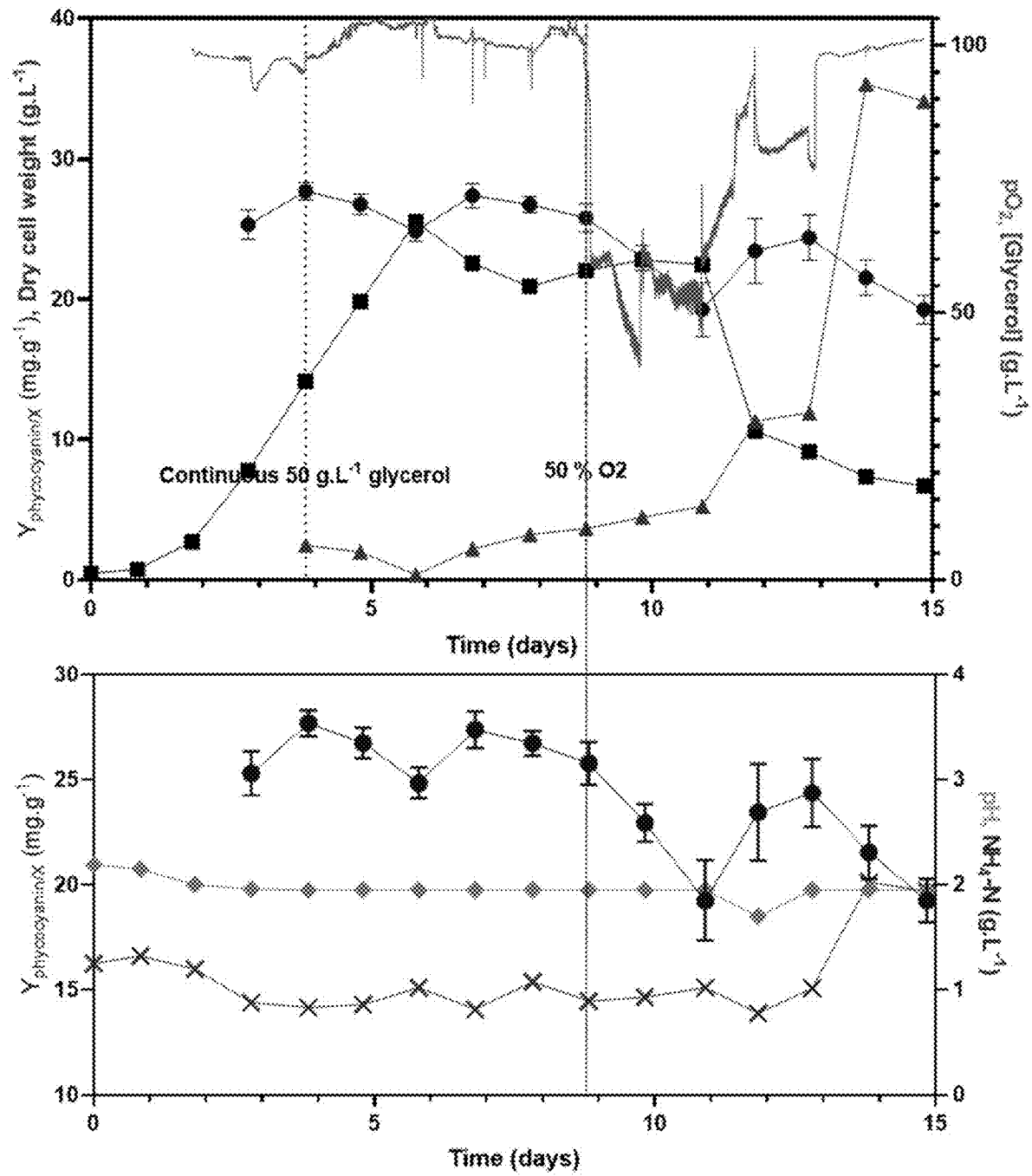

FIG. 14 shows continuous cultivation with nitrogen maintained by automated pH control in MK 4 airlift bioreactor; Continuous flow cultivation at 1.0 per day dilution rate in the MK 4 airlift bioreactor with 50 g·L$^{-1}$ glycerol as the growth limiting substrate. Oxygen is maintained at ~100% from days 4 to 9, at which point it was reduced to 50% by lowering air flow rate. The reduced mixing and high dilution rate exerted a washout effect and glycerol concentration in the reactor increased dramatically. Dry cell weight (g·L$^{-1}$) ■; Glycerol concentration (g·L$^{-1}$) ▲; Growth medium oxygen saturation (%) ▼; Specific phycocyanin concentration (mg·g$^{-1}$) ●; nitrogen concentration x (g·L$^{-1}$), pH ♦.

Figures 15A, 15B:
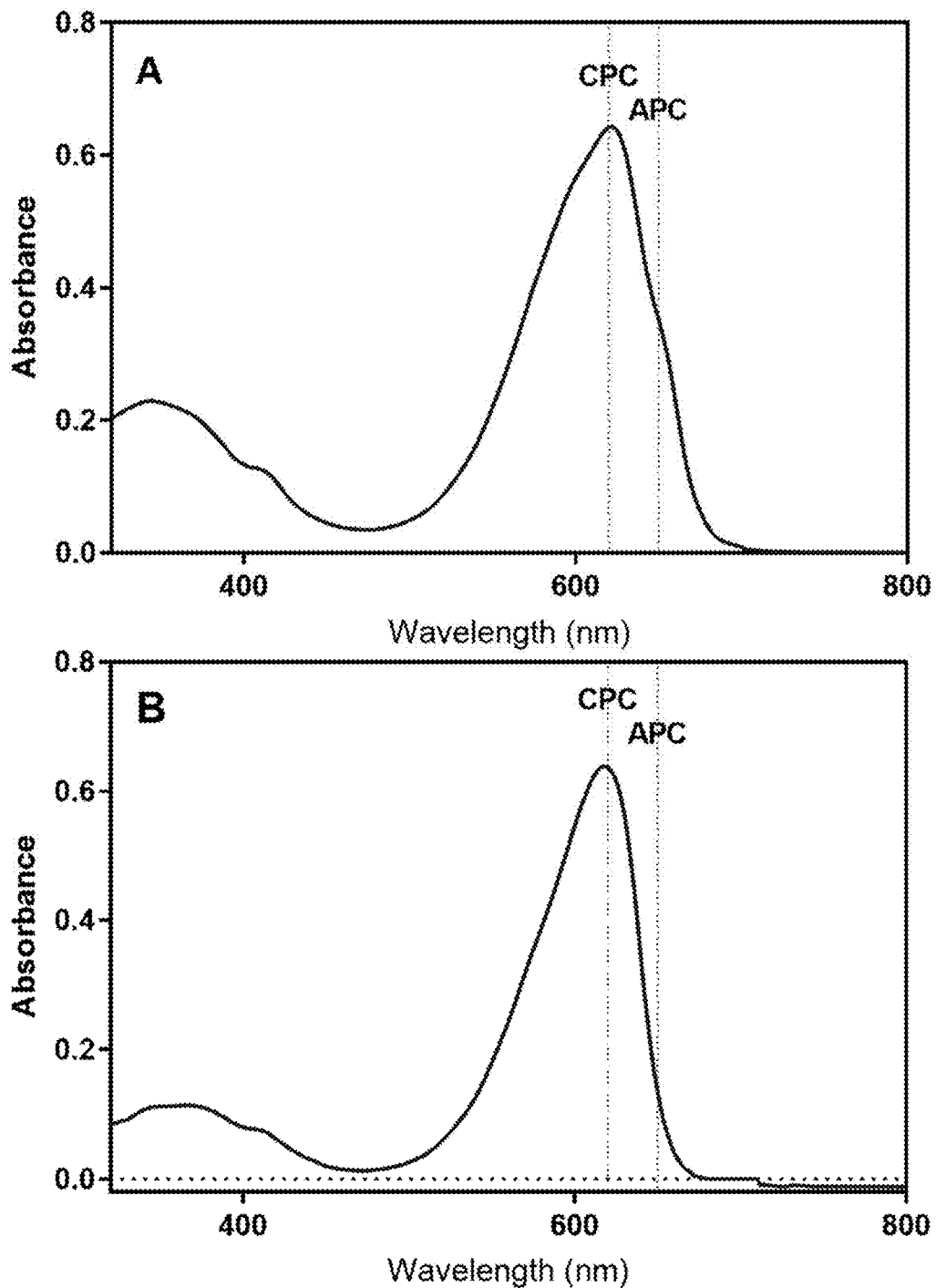

FIG. 15 shows the lack of allophycocyanin (APC) pigment from purified cell extract of Galdieria (B) grown heterotrophically on glycerol compared to autotrophic Spirulina (A).

Figure 16:
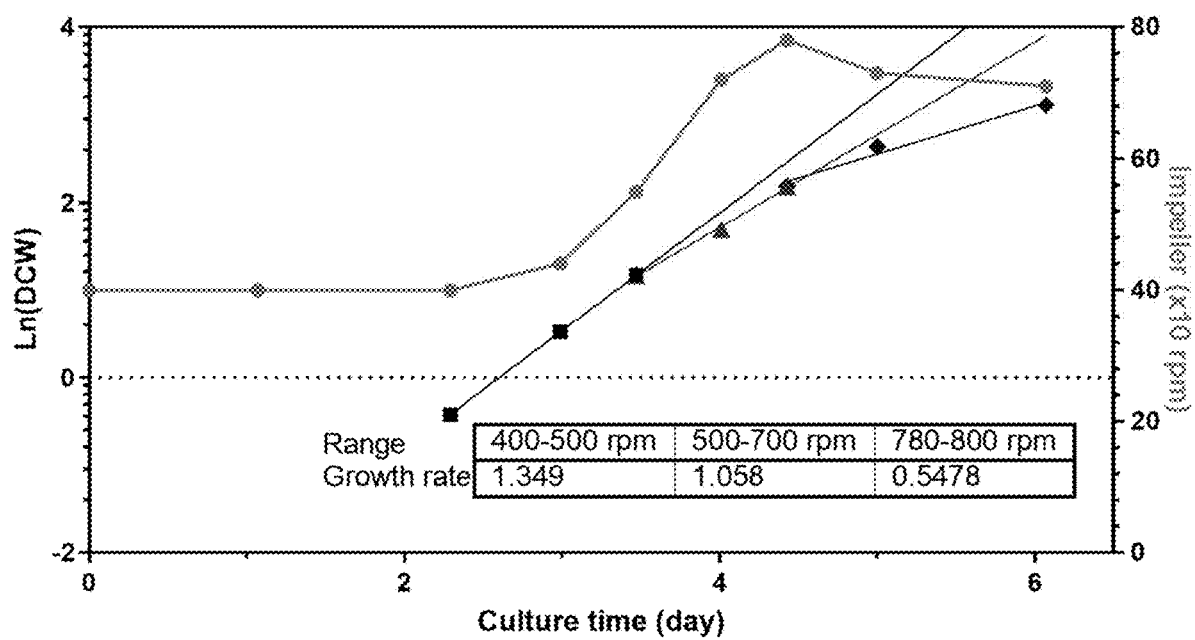

FIG. 16 is another figure showing the growth rate of G. sulphuroria decreases as impeller velocity increases. A fed batch cultivation in the stirred tank reactor was performed with 15 g·L$^{-1}$ glycerol as the starting growth substrate and 300 g·L$^{-1}$ glycerol feed. Impeller velocity (circles ●) was set automatically by the system in order to maintain 100% oxygen saturation with 4.0 L·min$^{-1}$ air. Natural logarithm of the biomass concentration was used to calculate growth rates in three sample intervals at increasing impeller rates (squares■ 400-500 rpm, triangles ▲500-700 rpm, diamonds ♦700-800 rpm).

Figure 4:
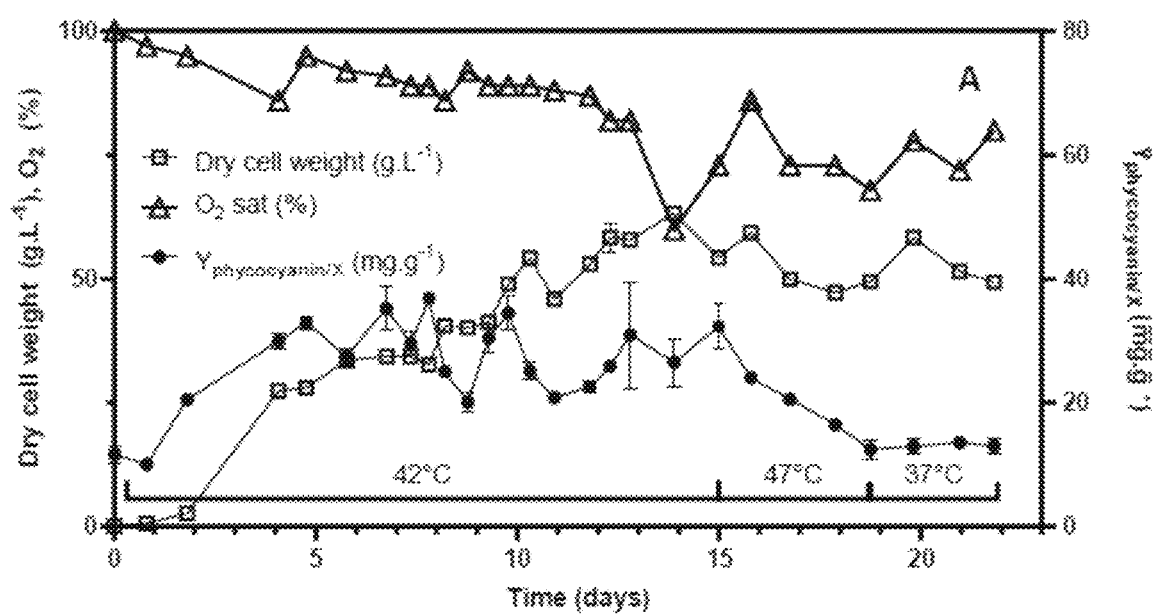
FIG. 4 shows Continuous cultivation on glycerol in the dark at various temperatures.
Figure 17:
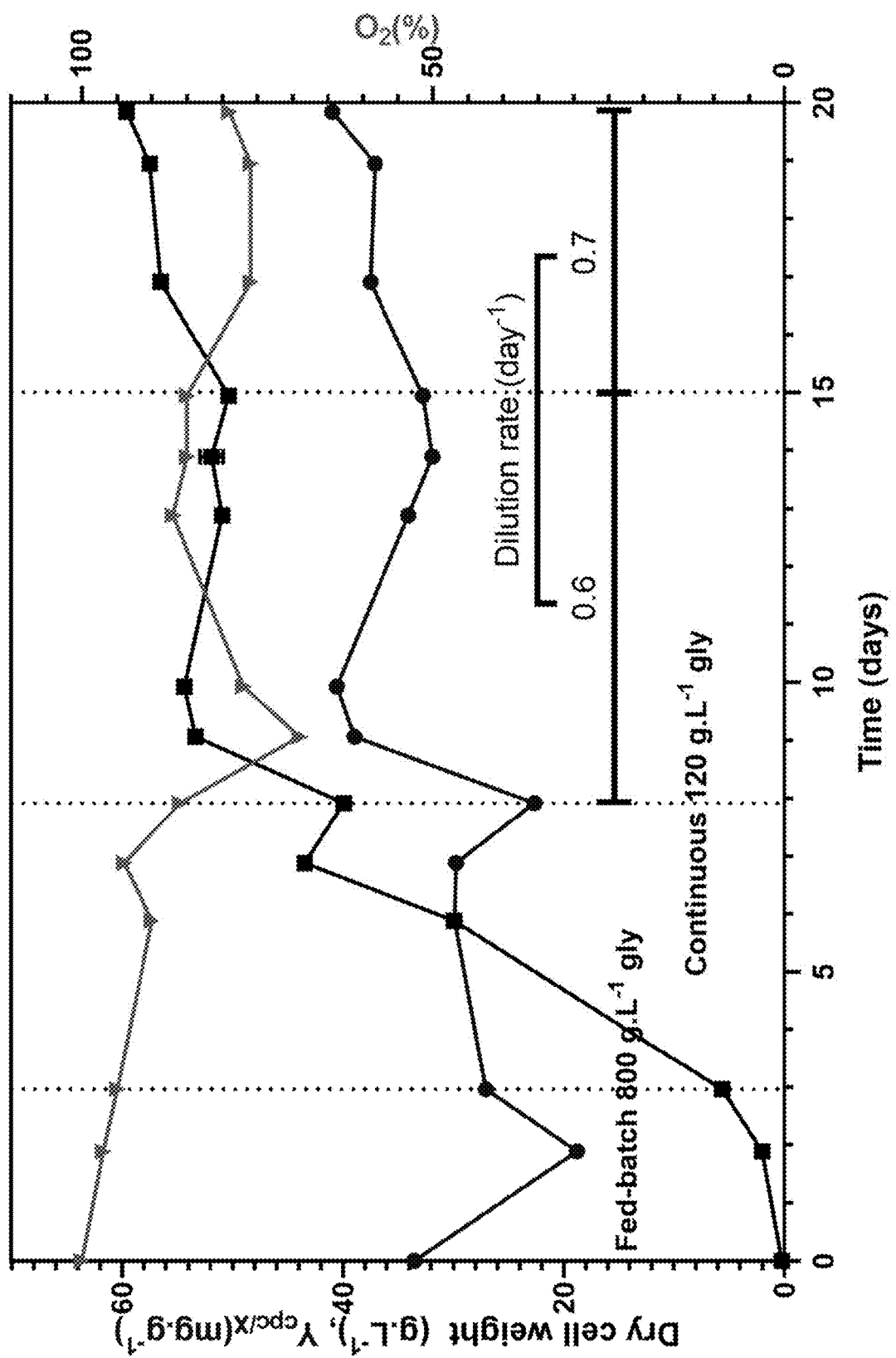

FIG. 17 shows the same data as FIG. 4 in more detail. Refined glycerol (800 g·L$^{-1}$ fed batch, 120 g·L$^{-1}$ continuous feed) was used to cultivation Galdieria at 4.0 L scale in the MK 4 bioreactor at 42° C. Biomass (squares ■) was grown up to 45 g·L$^{-1}$ in semi-continuous conditions up to day 8, at which point continuous flow of feed was started at a dilution rate of 0.7 day$^{-1}$ for a 12 day period. Automatic addition of 10 M NH$_4$OH maintained the pH at 2.0 and formed the main nitrogen source for the culture. Phycocyanin (circles ●) is maintained above 35 mg·g$^{-1}$ throughout the continuous phase, accordingly with high oxygen saturation (inverted triangles ▼) in the reactor throughout the same period.

Figure 18:
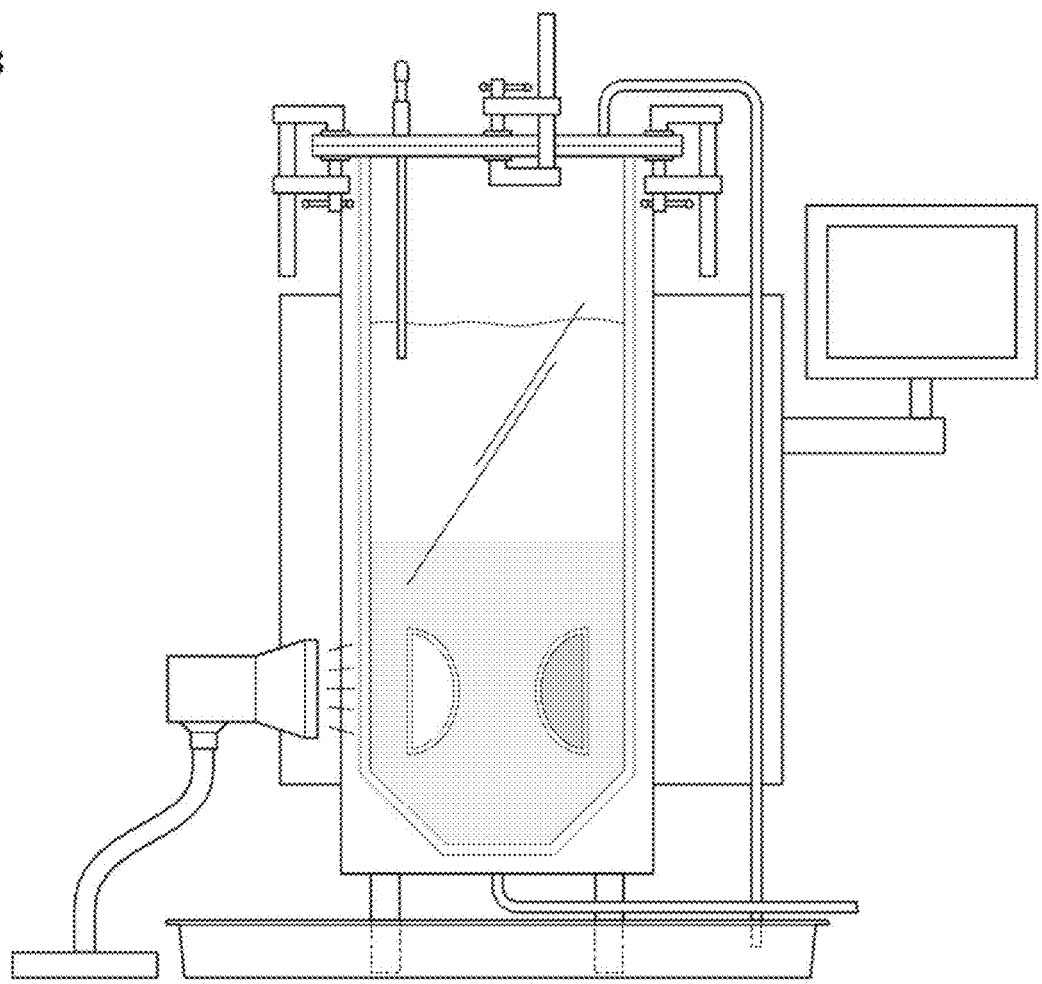
Figure 19:
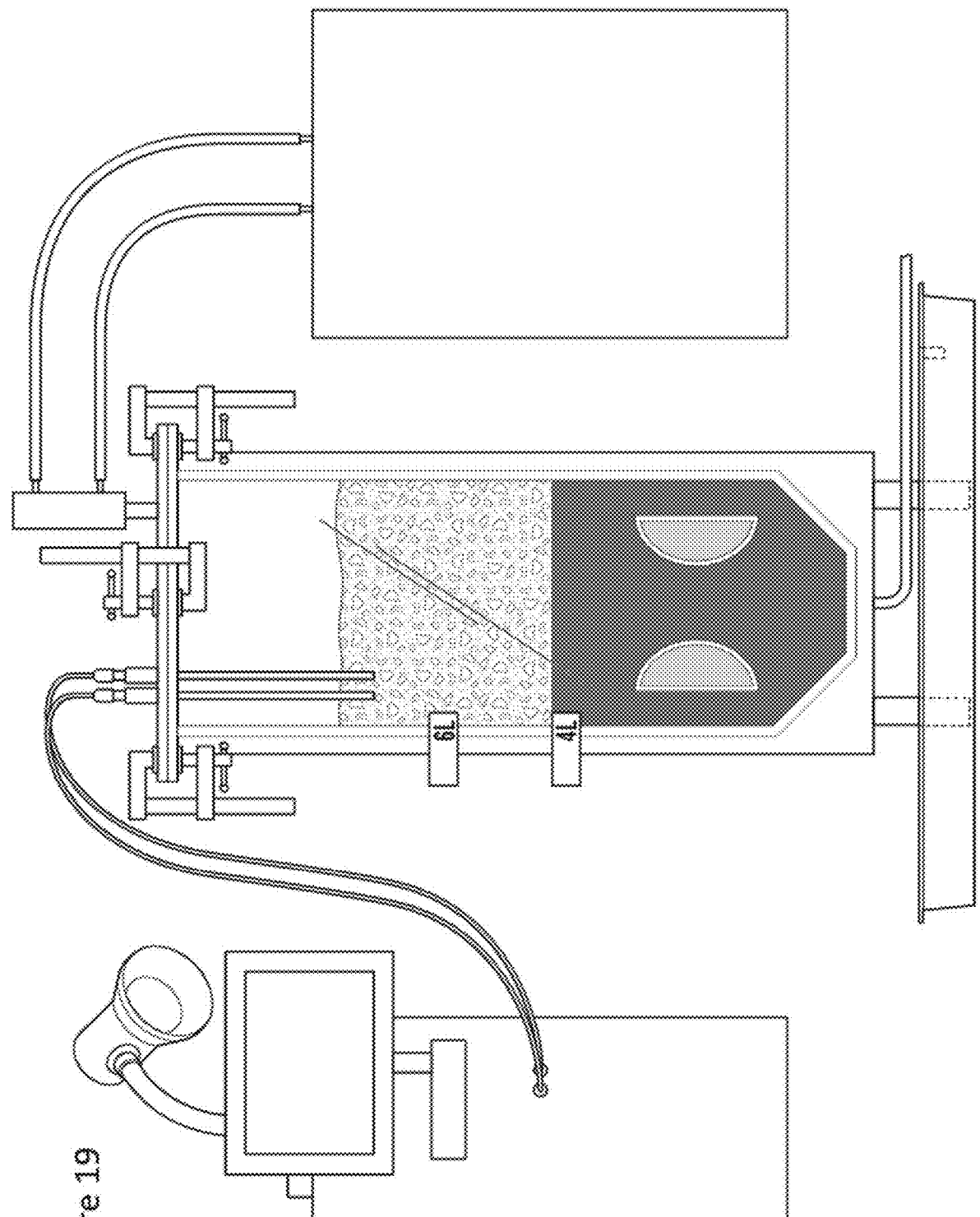

FIGS. 18 and 19 show further images of the reactor for culturing algae according to the invention in use during a culture. FIG. 19 shows the same reactor as FIG. 18 with the faceplate removed demonstrating the *Galdieria* culture inside.

Figure 20:
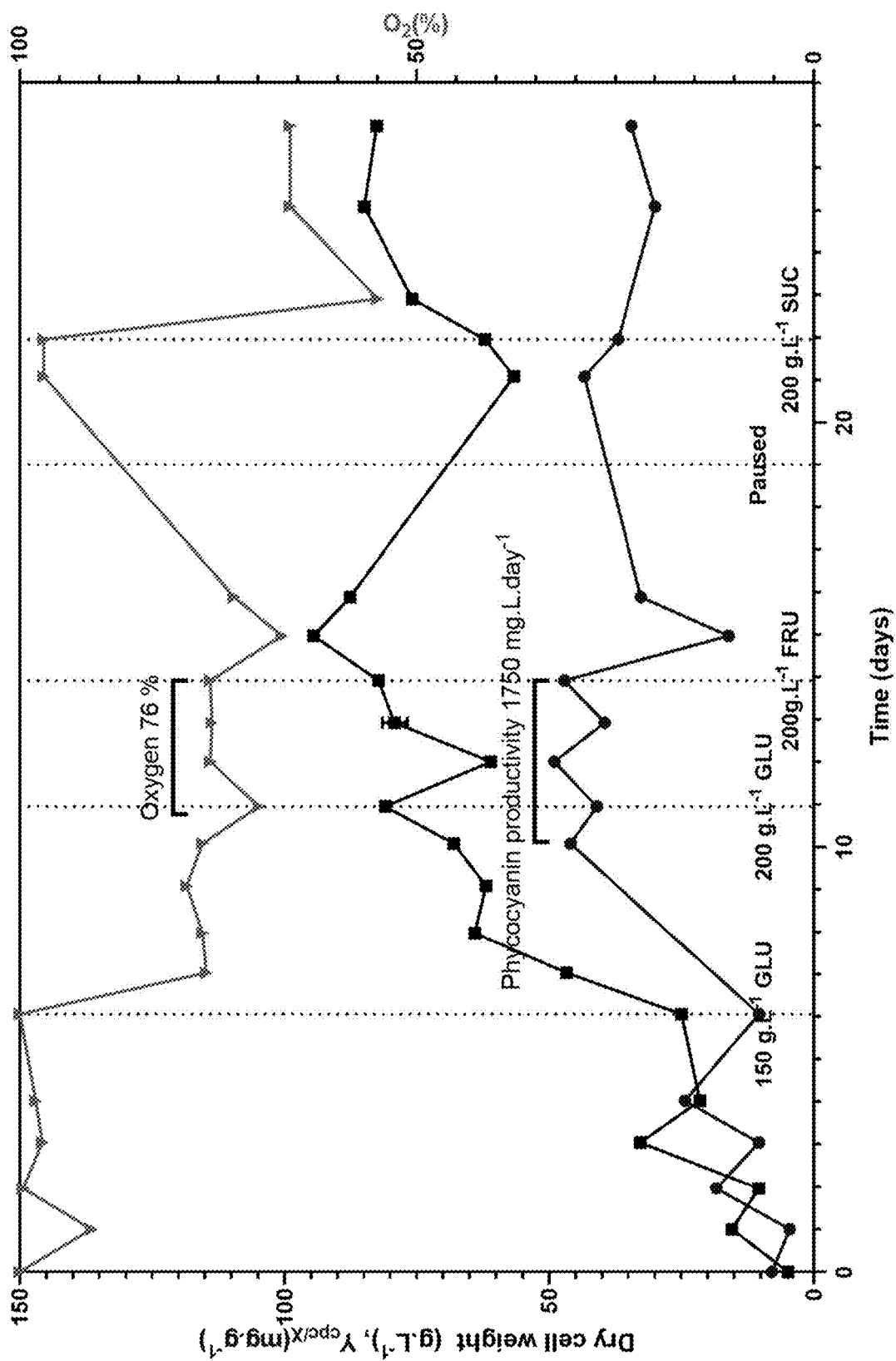

FIG. 20 shows D-glucose, fructose and sucrose (500 g·L$^{-1}$ fed batch, 150-200 g·L$^{-1}$ continuous feed) was used to cultivate *Galdieria* at 4.0 L scale in the MK 4 bioreactor at 42° C. Growth monitoring was initiated at semi-continuous phase (day 0) with 500 g·L$^{-1}$ glucose, at a growth rate of 0.6 day$^{-1}$ Biomass (squares ■) was grown up to 25 g·L$^{-1}$ in semi-continuous conditions up to day 6, at which point continuous flow of feed was started at a dilution rate of 0.6 day$^{-1}$ with 150 g·L$^{-1}$ D-glucose. Once the culture reached a steady biomass concentration (~65 g·L$^{-1}$), the feed glucose concentration was increased to 200 g·L$^{-1}$ on day 11. Stable production was maintained for 5 days at which point the carbon was changed to fructose. Some samples were lost representing the gap in the data. A pump blockage at day 19 prompted a pause in the continuous flow regime, restarted 2 days later with sucrose (200 g·L$^{-1}$) as the carbon source. Steady state was reached for 5 more days until the experiment was halted. Phycocyanin (circles ●) is maintained above 35 mg·g$^{-1}$ throughout the continuous phase, accordingly with high oxygen saturation (inverted triangles ▼), except for day 19 when the feed was changed to fructose. Dry cell weight measurements are in triplicate error bars only shown when larger than point (±SEM).

Certain aspects and embodiments of the invention will now be demonstrated by the following non-limiting examples.

Examples

Materials and Methods

A. Medium

Heterotrophic medium is based on optimisations from Minoda, with inorganic components from the below concentrations suitable for 10 g·L$^{-1}$ growth limiting carbon substrate (Minoda et al., 2004).

These elements are scaled proportionally depending on final carbon concentration of medium, with typical batch medium at 20 g·L$^{-1}$ carbon, semi-continuous from 500-750 g·L$^{-1}$ carbon, and continuous from 50-300 g·L$^{-1}$. Flask studies described used glucose as the primary carbon substrate, whilst bioreactor scale studies used glycerol unless otherwise stated.

Final inorganic components and concentrations are as follows for 10 g carbon (g·L$^{-1}$): $(NH_4)_2SO_4$ 2.62, $KH_2PO_4$ 0.54, $MgSO_4 \cdot 7H_2O$ 0.5, $CaCl_2 \cdot 2H_2O$ 0.056, $FeCl_3$ 0.028, $EDTA.Na_2$ 0.016; with trace elements to a final concentration of (mg·L$^{-1}$): $H_3BO_3$ 5.72, $MnCl_2 \cdot 4H_2O$ 3.64, $ZnCl_2$ 0.21, $Na_2MoO_2 \cdot 2H_2O$ 0.78, $CoCl_2 \cdot 6H_2O$ 0.08, $CuCl_2$ 0.086. For plate preparation, double concentrated solutions of medium and agar were sterilised separately by autoclave and combined in a 1:1 ratio after brief cooling.

pH of medium is adjusted to 2.0 with 5 M $H_2SO_4$ unless otherwise stated. For continuous cultivations utilising glycerol, $(NH_4)_2SO_4$ is replaced with $H_2SO_4$ in a 1:2 mole ratio, see Table. For feeding solutions of semi-continuous cultivations, $(NH_4)_2SO_4$ is not added, and pH is adjusted to 2.0.

TABLE 1

Continuous nitrogen-free medium

|  | Mr | Conc (g · L$^{-1}$) | M |
|---|---|---|---|
| Glycerol | 92.09 | 150.00 | 1.63 |
| Carbon | 11.00 | 53.75 | 4.89 |
| N for 10:1 C:N ratio | 7.00 | 3.42 | 0.49 |
| Moles H+ needed | 1.00 | 0.49 | 0.49 |
| Minus pH 2.0 H+ |  |  | 0.47 |
| Required conc $H_2SO_4$ (mL · L$^{-1}$) |  |  | 25.47 |
| Equivalent $(NH_4)_2SO_4$ mass | 132.14 | 32.28 | 0.24 |

TABLE 1

Semi-continuous nitrogen-free medium

|  | Mr | Conc (g · L) | M |
|---|---|---|---|
| Glycerol | 92.09 | 500.00 | 5.43 |
| Carbon | 11.00 | 179.17 | 16.29 |
| N for 10:1 C:N ratio | 7.00 | 11.40 | 1.63 |
| Moles H+ needed for pH 2.0 | 1.00 | 0.01 | 0.01 |
| Required conc $H_2SO_4$ (mL · L$^{-1}$) |  |  | 0.54 |
| Equivalent $(NH_4)_2SO_4$ mass | 132.14 | 107.61 | 0.81 |

B. Cultivation Techniques

Flask

Flask cultures are operated at 100 mL working volume in 250 mL Erlenmeyer flasks, maintained at 42° C. and 200 rpm agitation in the dark using an Incu-Shake MIDI incubating shaker (SciQuip, UK). Offline pH monitoring is performed using a benchtop pH-temperature probe (Eppendorf, UK).

Stirred Tank Bioreactor

Stirred tank bioreactor experiments used a Minifors 2 (Infors, CH) 1.0-2.0 L working volume glass reactor containing a 2 bladed Rushton turbine operated between 400-800 rpm depending on the study.

Airlift Bioreactors

A series of airlift bioreactors with working volumes ranging from 2.5-4.0 L were used in this study. All are made of acrylic sheet 0.6-0.8 mm thick for bespoke construction. Air flow rates used depend on the working volume, set between 0.5-1.5 VVM. Excessive foaming in the reactors was controlled by antifoaming agent (Sigma, UK).

Bioreactor Control

The Minifors control system was used in conjunction with all variant bioreactors, and connected to a computer via the OPC-UA standard to allow time dependent control of parameters. Exponential pump feeding profiles for semi-continuous cultivations were calculated using Microsoft Excel with intended resultant growth rates between 1.0-1.2 day$^{-1}$.

A bespoke Arduino based pH controller was designed in order to control ammonia gas dosing via a solenoid valve 100T3MP12-32 (Biochemfluidics, UK).

C. Monitoring

Growth

Growth was monitored in a time-dependent basis. Cell suspension absorbance was measured at 800 nm to prevent any pigment interactions (Gross et al., 1998) using an 5-200 spectrophotometer (Boeco, Germany) with a light path of 1 cm and a blank of deionised water. Where necessary, cells were diluted with deionised water to ensure absorbance measurements below 0.7 cm$^{-1}$.

1-10 mL of cells (or 5-50 mg dry cells) were taken in triplicate unless otherwise stated for determination of dry cell weight (DCW). Cells were centrifuged at 18,000×g for 30 seconds, the supernatant discarded, repeated twice with a resuspension in deionised water to remove medium components. Washed cells were resuspended in 1 mL deionised water and frozen at −80° C. at least overnight for subsequent lyophilisation for 24 hours under vacuum.

Phycocyanin 10-50 mg of lyophilised cells were resuspended in 1.5 mL of 100 mM potassium phosphate buffer at pH 7.2. Mechanical disruption was performed using cell disruption tubes (2 mL capacity, 0.5 mm Zirconium beads, Sigma-Aldrich, USA) and a BeadBug homogeniser (Benchmark Scientific Inc., USA) at a speed of 4000 rpm in 5-8 60 second cycles, with tubes cooled at 4° C. between cycles.

Cell lysate was centrifuged at 18,000×g for 60 minutes at 4° C., and 500 µL of blue supernatant was removed and diluted as necessary for spectrophotometric analysis as described below.

Phycocyanin extracts were transferred to a 1 cm light path cuvette to undergo analysis. Absorbance was read by spectrophotometer at 320, 562, 620 and 652 nm, and the C-PC content estimated as described by (Kursar and Alberte, 1983) demonstrated with equation 1 below.

$$\text{Phycocyanin}(\text{mg}\cdot\text{ml}^{-1}) = \frac{A_{620} - 0.474(A_{652})}{5.34}. \quad 1$$

Glycerol

Glycerol concentration of the medium was monitored when glycerol was supplemented into the medium. Glycerol free reagent (Sigma-Aldrich) was used according to the manufacturer's instructions, which is an enzymatic assay leading to the production of a green quinoneimine from glycerol. Medium samples were diluted 100× and final absorbance read at 540 nm.

Nitrogen

Ammonium concentration of the growth medium was determined using a modified version of the Berlethot reaction (Rhine et al., 1998) wherein a solution containing ammonium is made basic, it produces ammonia, which reacts with 2-phenylphenol to produce a blue indophenol complex. Initial samples were diluted $250^{-1}000\times$ and absorbance was read at 660 nm following reaction mixture incubation of 1 hour using a plate reader (Victor$^2$ 1420, Wallac).

Results

Figure 1:
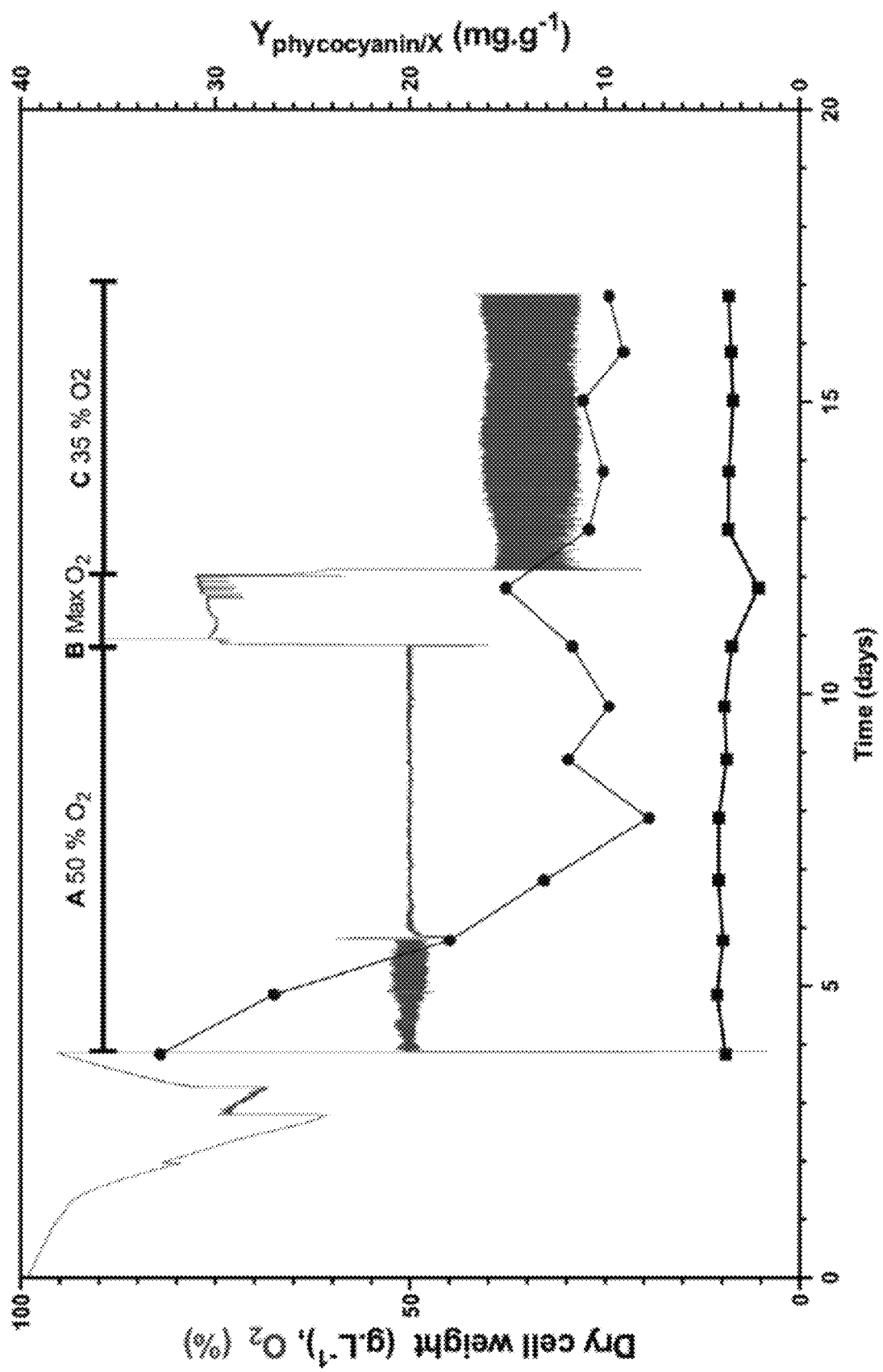

Oxygen Saturation and Reactor Efficacy in Production of Phycocyanin from *Galdieria sulphuroria* a) Failure to promote high oxygen saturation in stirred tank reactors and reduction in phycocyanin during glycerol growth. G. *sulphuroria* was grown in continuous flow conditions at 0.6 $D^{-1}$ with 20 g·L$^{-1}$ glycerol as the growth limiting substrate at 2.0 L working volume in a standard Minifors 2 (Infors, CH) dual-Rushton turbine mixed glass bioreactor. Batch phase growth was supported by 10 g·L$^{-1}$ glucose to provide a high starting point of intracellular phycocyanin of 32.8±0.8 mg·g$^{-1}$ dry cell weight before initiation of continuous flow at day 4 (FIG. 1). At 50% oxygen saturation and glycerol as the carbon source, intracellular phycocyanin reduces to a low of around 10 mg·g$^{-1}$ dry cell weight over the course of four days of continuous cultivation. The dry cell weight remained stable throughout the culture (black squares ■). At day 11, the maximum non-damaging settings for the stirred tank reactor of 500 rpm and 2.0 L·min$^{-1}$ air flow were unable to reach close to 100% oxygen saturation, becoming stable at 70% despite the low glycerol substrate concentration of 20 g·L$^{-1}$.

b) Reduction in growth rate at impeller speeds above 500 rpm

Figure 2A:
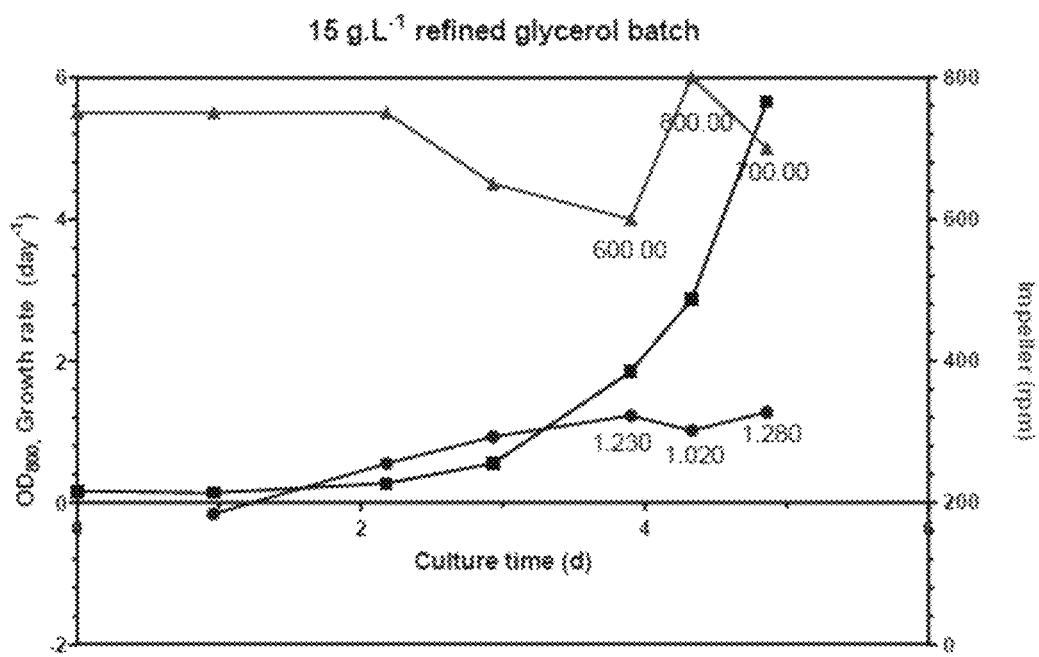
Figure 2B:
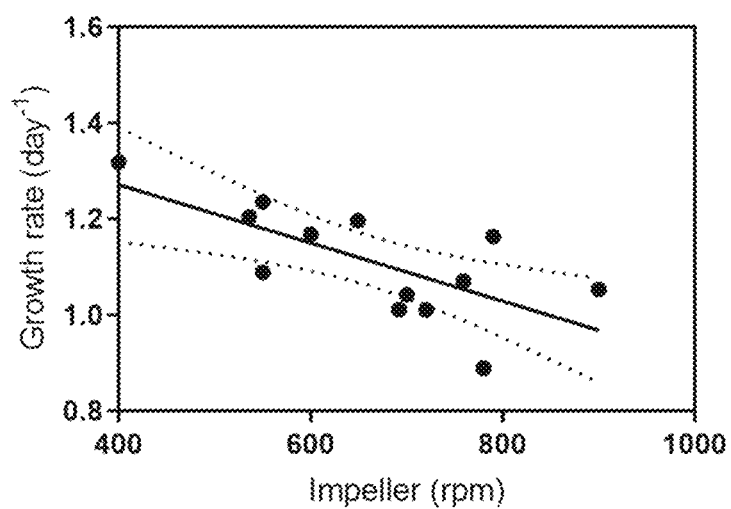

FIG. 2B and FIG. 16 demonstrate reductions in growth rate of *Galdieria sulphuroria* under heterotrophic conditions as impeller velocity of a stirred tank bioreactor increases.

15 g·L$^{-1}$ glycerol was used as the starting carbon substrate in order to prevent glycerol-mediated growth inhibition ensuring a high initial growth rate of 1.35 day$^{-1}$. Semi-continuous cultivation was initiated at day 4 preventing glycerol dropping below 5 g·L$^{-1}$, and did not go above 12 g·L$^{-1}$ for the remainder of the experiment. Impeller velocity was automatically controlled by the system to maintain >95% oxygen saturation, with a minimum setting of 400 rpm. Above 10 OD$_{800}$ (3.25 g·L$^{-1}$ dry cell weight), the system began increasing impeller velocity, leading to reductions in growth rate to 1.05 day$^{-1}$ for a 24 hour period between 500-700 rpm, and 0.54 day$^{-1}$ at 780-700 rpm at 4.5 to 6 days. A peak impeller velocity is observed at 4.5 days at which point the velocity begins to fall. This is likely due to the relationship between the density of cells taking up oxygen and those being damaged by the impeller, leading to an equilibrium in oxygen requirement.

In a stirred tank reactor, shear is exerted into the medium in order to reduce the size of flowing air bubbles and reduce mixing times, improving mass transport in the system. Our observations determined that maintaining high growth rates as well as high oxygen saturation during heterotrophic growth, with cell densities above 10 g·L$^{-1}$, required impeller velocities damaging to the organism. An alternative strategy was pursued, through the use of an airlift system.

c) Improved Oxygen in airlift reactor and production of phycocyanin in the dark maintained.

Initial attempts to increase oxygen concentration in traditional stirred tank bioreactors failed due to shear on the algal cells causing damage (see section (a) and (b)). It was not possible to maintain high oxygen concentration (by mixing) whilst also maintaining high productivity of biomass and phycocyanin. In order to solve this problem, we developed a low-shear airlift bioreactor design specifically adapted to achieve high oxygen concentrations for high density cultivation of g. *sulphuroria*.

Cultivation was initiated on 10.5 g·L$^{-1}$ glycerol at pH 2.0 and 42° C. with 6.0 L·min$^{-1}$ air flow at 4.0 L working volume (FIGS. 4 and 17) in the airlift bioreactor (FIGS. 5A,B,C and FIGS. 18 and 19). Batch phase growth proceeded at 1.0 day$^{-1}$ and reached a biomass concentration of 5.6 g·L$^{-1}$ by day 3. At this point, semi-continuous growth was initiated at a rate of 0.6 day$^{-1}$ with 800 g·L$^{-1}$ glycerol feed. Nitrogen addition occurred automatically under pH feedback control with 10 M NH$_4$OH used to maintain pH 1.9 in the reactor. 500 mL of semi-continuous feed was added until day 7, at a resultant growth rate of 0.54 day$^{-1}$ to a biomass concentration of 43.4 g·L$^{-1}$. On day 8, continuous flow of 120 g·L$^{-1}$ nitrogen free glycerol feed was started at a dilution rate of 0.6 day$^{-1}$. At day 15 the dilution rate and feed glycerol concentration was increased to 0.7 day$^{-1}$ and 130 g·L$^{-1}$ respectively for the remainder of the experiment (FIGS. 4 and 17).

During the continuous flow period at a dilution rate of 0.6 day$^{-1}$ a mean biomass productivity of 32.3±0.8 g·L$^{-1}$·day$^{-1}$ for a yield on substrate of 0.435, very close to previously reported data ($Y_{x/s}$ 0.43) (Graverholt and Eriksen, 2007). The culture produced a high phycocyanin productivity which was 1151±61 mg·L$^{-1}$·day$^1$ compared to the literature (861 mg·L·day$^1$) representing a yield of phycocyanin on glycerol of 15.5 mg·g$^{-1}$. Increasing the dilution rate and feed glycerol increased biomass productivity to 40.5±0.6 g·L·day$^1$, for a Y$_{x/s}$ of 0.45. During this period oxygen dropped slightly compared to at 0.6 day$^{-1}$ dilution rate (85-75% saturation), however, intracellular phycocyanin continued to increase up to a high of 41.0 mg·g$^{-1}$ on day 20, producing a very high phycocyanin productivity over the last three days of 1560±57 mg·L·day$^{-1}$, almost double that previously reported in the literature (Graverholt and Eriksen, 2007).

Table 3 demonstrates the high productivities obtained in our airlift reactor system in the dark. These data compare favourably to existing literature, with a mean intracellular phycocyanin content of 27.95 mg·g$^{-1}$ dry cell weight over the course of 10 days at 42° C. During this period feed glycerol concentration varied from 90-230 g·L$^{-1}$, and a high of 1.7 g·L$^{-1}$·day$^{-1}$ volumetric productivity was obtained for 2.5 days with lab grade glycerol at 100 g·L$^{-1}$ concentration. These data are double the highest productivities observed in stirred tank reactors using glucose in the literature: Graverholt 2007 achieved an intracellular concentration of 15.6 mg·g$^{-1}$ dry cell weight and volumetric productivity 0.86 g·L$^{-1}$·day$^1$.

Indeed the level of phycocyanin expressed is more comparable to data obtained with the addition of illumination of the cells using light emitting diode arrays to reach somewhere in the region of 35-40 mg·g$^{-1}$ dcw (WO2017/050917). Additional observations by Sloth also demonstrated a greatly increased phycocyanin content of 20 mg·g$^{-1}$ dcw when grown algae were grown on glycerol and in light (at 65 µmol photons·m$^{-2}$·s$^{-1}$) (Sloth et al., 2006).

phase, the difference suggested to be caused by a short period wherein the oxygen concentration dropped between days 2 and 3 (FIG. 1). It is believed that the reduction to 50% oxygen saturation around day 6 is an erroneous measurement, as upon inspection a large biofilm had clogged the dissolved oxygen probe. Indeed further supporting this conclusion is the fact that no effect on phycocyanin was observed. A total of 950 mL of 500 g·L$^{-1}$ glycerol feed was added resulting in a final dry cell weight of 58 g·L$^{-1}$ and a yield of 0.48, comparable to figures reported in the literature.

As shown by FIG. 4 and table 3, phycocyanin is maintained at high intracellular levels (23-30 mg·g$^{-1}$ dry cell weight) for an extended period of 10 days, whilst oxygen was maintained above 75% saturation within the reactor even with high glycerol concentrations between 90-230 g·L$^{-1}$ using our airlift reactor system.

1. e) Continuous cultivation on other carbon sources

FIG. 20 demonstrates a continuous study using mono- and dissacharides.

Glucose, fructose and sucrose were sequentially used to cultivate *Galdieria sulphuroria* in continuous conditions in the airlift bioreactor, producing high phycocyanin productivities when oxygen was maintained at high saturations (FIG. 20, Table 4).

Cultivation was initiated in semi-continuous mode for 6 days, wherein the biomass reached 25.0 (±0.4) g·L$^{-1}$. In this study computer control problems led to the pump rate not being variable, and instead the feed pump rate was manually changed according to the current biomass on a daily basis. As such, a smooth growth curve is not observed (FIG. 20). Continuous phase growth was started at 150 g·L$^{-1}$ D-glucose and a dilution rate of 0.6 day$^{-1}$, leading to rapid growth for two days up to a stable concentration (e.g. days 7-10 64.7

TABLE 3

Productivity of continuous culture in novel reactor on different glycerol substrates

| Condition | Interval time (days) | Substrate | So (g · L$^{-1}$) | D (day$^{-1}$) Mean | SEM | Dry cell weight (g · L$^{-1}$) Mean | SEM | P$_x$ (g · L · day$^{-1}$) Mean | SEM | Y$_{x/s}$ (g · g$^{-1}$) Mean | SEM | Phycocyanin (mg · g$^{-1}$) Mean | SEM | P$_{phycocyanin}$ (mg · L · day$^{-1}$) Mean | SEM |
|---|---|---|---|---|---|---|---|---|---|---|---|---|---|---|---|
| Batch | 1.82 | Glucose | 10 | 0 | | 1.2 | ±0.8 | 0 | 0 | | | 14.1 | ±3.2 | 0 | ±18 |
| Fed-batch | 2.94 | Glucose | 540 | 0 | | 27.7 | ±0.3 | 0 | 0 | 0.05 | ±0 | 31.4 | ±1.5 | 0 | ±107 |
| BDG 9% | 3.05 | Biodiesel glycerol | 90 | 0.43 | ±0 | 33.7 | ±0.4 | 14.5 | ±1.7 | 0.38 | ±0 | 30.8 | ±2.3 | 453 | ±161 |
| BDG 10% | 1.98 | Biodiesel glycerol | 115 | 1.04 | ±0.1 | 42.8 | ±2.1 | 41.7 | ±5.4 | 0.37 | ±0 | 27.5 | ±3.2 | 1126 | ±165 |
| BDG 20% | 2.5 | Biodiesel glycerol | 230 | 0.7 | ±0.1 | 53 | ±2.6 | 36.9 | ±4.8 | 0.2 | ±0 | 23.6 | ±1.2 | 1210 | ±131 |
| Gly 100 g · L 42° c. | 2.69 | Lab glycerol | 100 | 0.73 | ±0 | 58.6 | ±2.6 | 42.8 | ±2.1 | 0.59 | ±0 | 29.9 | ±1.8 | 1703 | ±204 | d) Fed batch culture also shows improvement compared to the literature

Figure 3:
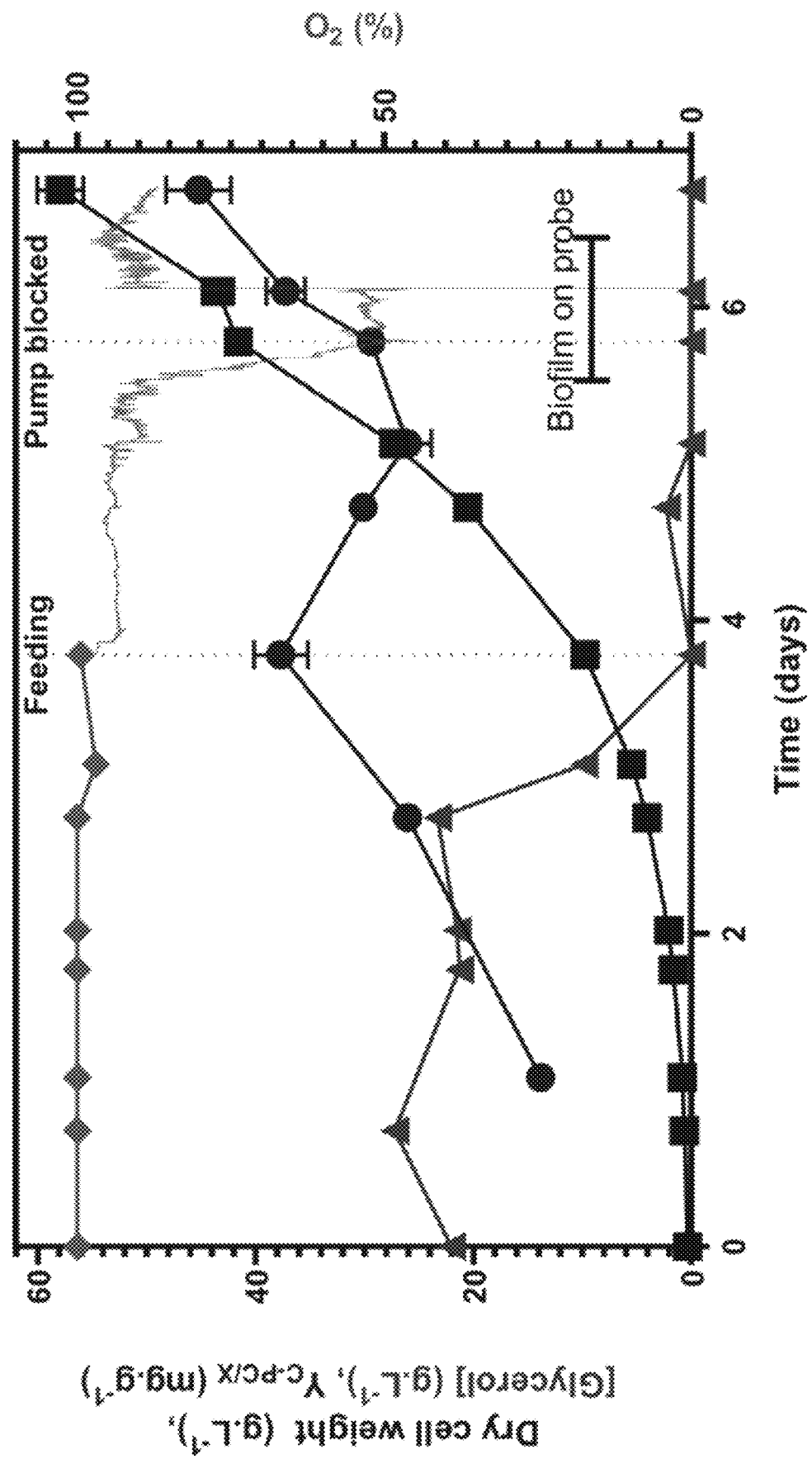

FIG. 3 adds further evidence supporting improvements in phycocyanin production and intracellular expression of phycocyanin when using a high oxygen saturation in our airlift system. Exponential growth on glycerol initiated at 20 g·L$^{-1}$ batch substrate concentration was maintained over a period of 7 days averaging a growth rate of 0.81 D$^{-1}$ despite feed pump blockage towards the end of the study. Oxygen was maintained at a high saturation throughout the study, indeed correlating with a very high intracellular phycocyanin content reaching 37.7±2.4 mg·g$^{-1}$ at the end of the batch phase at day 3.5, and 45.2±3.0 mg·g$^{-1}$ by day 7 when feeding was stopped. This compares favourably with our own stirred tank data that reached 32.8±0.8 mg·g$^{-1}$ on glucose in the batch (±1.8) g·L$^{-1}$). Oxygen reduced and became stable between 75-80% saturation, whilst intracellular phycocyanin was maintained accordingly at 44.2 (±2.3) mg·g$^{-1}$ between days 10-14, despite the glucose concentration being increased on day 11 to 200 g·L$^{-1}$. Mean phycocyanin productivity was 1796 (±151) mg·L·day$^{-1}$. Yield of biomass on substrate was 0.38 (±0.03) g·g$^{-1}$.

The growth substrate was changed to fructose (200 g·L$^{-1}$) on day 14, leading to a sharp drop in phycocyanin. This recovered after 24 hours, and is likely a consequence of a short lag phase wherein the organism is switching its metabolism to utilise the new substrate causing a rise in carbon in the reactor. Excessive carbon is well known to inhibit phycocyanin production (Sloth 2006). Some data was lost between days 16-19, however the continuous culture remained operational until a pump blockage caused a pause on day 19.

On day 21, the carbon substrate was again changed to sucrose (200 g·L$^{-1}$). Sucrose, as a disaccharide is presumed to require additional oxygen to overcome its higher energy density compared to say glucose (i.e. sucrose is more reduced). Accordingly, oxygen saturation in the reactor was stable at 65% between the steady state of days 25-27, compared to 75%+ on 200 g·L$^{-1}$ glucose. Tests are necessary to find maximum growth rates for the given system, as phycocyanin concentration is reduced when oxygen is lower (33.9±2.04 mg·g$^{-1}$). The higher biomass produced from sucrose (81.2±2.75 g·L$^{-1}$, 48.7 g·L$^{-1}$·day$^{-1}$) offset reduced phycocyanin, for a productivity of 1540±95 mg·L$^{-1}$·day$^{-1}$.

TABLE 4

Continuous cultivation on mono- and di-saccharides

| Substrate | So | Dry cell weight (g · L$^{-1}$) D (day$^{-1}$) | | $P_x$ (g · L · day$^{-1}$) | | $Y_{X/S}$ (g · g$^{-1}$) | Phycocyanin (mg · g$^{-1}$) | $P_{phycocyanin}$ (mg · L · day$^{-1}$) | |
|---|---|---|---|---|---|---|---|---|---|
| | | Mean | SEM | Mean | SEM | Mean | Mean | Mean | SEM |
| Glucose | 200 | 0.54 | 0.0 | 75.9 | 5.0 | 40.8 | 4.1 | 0.38 | 44.2 | 2.3 | 1796 | 151 |
| Fructose | 200 | 0.79 | 0.0 | 91.1 | 3.4 | 72.4 | 0.8 | 0.46 | 24.4 | 8.3 | 1768 | 616 |
| Sucrose | 200 | 0.60 | 0.0 | 76.4 | 5.1 | 45.9 | 11.9 | 0.38 | 33.8 | 2.0 | 1540 | 95 |

TABLE 5A

Comparison of Phycocyanin Production Methods
Table 2 Comparison of phycocyanin production

| Organism/ strain | Scale [type] | Trophic state | Carbon source | Scale (L) | Culture period (Days) | Light intensity | $O_2$ saturation | $S_0$ (g · L$^{-1}$) | μ (day$^{-1}$) |
|---|---|---|---|---|---|---|---|---|---|
| A. platensis | Open Pond, continuous | Auto-trophic | | 135,000 | 365 | Sunlight | — | — | 0.05 |
| G. sulphuraria SAG 108.79 | STR, continuous | Auto-trophic | 3% CO2 1 L · min$^{-1}$ | 0.7 | 11 | 100; RGB 60:0:40% | — | — | n.d. |
| G. sulphuraria 074G-G1 | STR, Fed batch | Hetero-trophic | D-Glucose | 1.2-2.5 | 8 | — | — | 50; 500 | <0.6 |
| G. sulphuraria 074G-G2 | STR, Continuous | Hetero-trophic | D-Glucose | 2.5 | 17 | — | — | 50; 50-150 | 0.6 |
| A. platensis | Bioreactor, Fed batch | Mixo-trophic | D-Glucose | 2.5 | 12.5 | 80-160 | — | 2; 100 | n.d. |
| G. sulphuraria 074G | Flask | Mixo-trophic | Food waste hydroly-sates | 0.15 | 7 | | | 5.00 | 1.22 |
| G. sulphuraria 074G | STR, Batch | Mixo-trophic | Glucose, fructose, sucrose | 2.5 | 10 | 30-50 | | 5; 5-500 | 1.01-1.1 |
| G. sulphuraria CCMEE 5587.1 | Outdoor bioreactor | Mixo-trophic | Urban wastewater | 100 | 60 | Sunlight 14:10 | | n.d. | n.d. |
| G. sulphuraria SAG 108.79 | STR, continuous | Hetero-trophic | Glucose batch; glycerol | 2 | 17 | — | 50%; 35% | 10; 20 | 0.6 (D$^{-1}$) |
| G. sulphuraria SAG 108.79 | Airlift, fed-batch | Hetero-trophic | Glycerol Glucose; glycerol; | 4 | 7 | | 86% | 20; 500 | 0.81 |
| G. sulphuraria SAG 108.79 | Airlift, continuous | Hetero-trophic | biodiesel glycerol | 4 | 23 | — | 80% | 10; 90; 100; 230 | 0.6-1.0 (D −1) |
| G. sulphuraria UTEX # 2919 | | Mixo-trophic | Glycerol | 2 | 16 | 150-300 | 5-30% | 30 | 0.6 |

| Organism/ strain | $P_X$ (g · L$^{-1}$ · day$^{-1}$) | $X_{Final}$ (g · L$^{-1}$) | $Y_{x/s}$ | $P_{cpc}$ (mg · L$^{-1}$ · day$^{-1}$) | $Y_{x/cpc}$ (mg · g$^{-1}$) | Reference |
|---|---|---|---|---|---|---|
| A. platensis | | — | — | 2.94 | 58.8 | (Jimenez et al., 2003) |
| G. sulphuraria SAG 108.79 | 0.262 | n.d. | — | 4.99 | 19 | (Baer et al., 2016) |
| G. sulphuraria 074G-G1 | | 109 | 0.41 | 473 | 26.7 | (Graverholt and Eriksen, 2007) |
| G. sulphuraria 074G-G2 | | 24.4-83.3 | 0.43 | 163-861 | 15.6 | (Graverholt and Eriksen, 2007) |
| A. platensis | | 10.24 | n.d. | 87 | 125 | (Chen and Zhang, 1997) |
| G. sulphuraria 074G | n.d. | 2.75 | 0.55 | n.d. | 3 | (Sloth et al., 2017) |
| G. sulphuraria 074G | n.d. | 72-100 | 0.46-0.54 | n.d. | 3.4-4.3 | (Schmidt et al., 2005) |

TABLE 5A-continued

Comparison of Phycocyanin Production Methods
Table 2 Comparison of phycocyanin production

| | | | | | | | |
|---|---|---|---|---|---|---|---|
| G. sulphuraria CCMEE 5587.1 | 0.165 | 2.5 | n.d. | n.d. | n.d. | (Selvaratnam et al., 2014) |
| G. sulphuraria SAG 108.79 | 3.5 | 9.1 | 0.46 | 100 | 11 | This study |
| G. sulphuraria SAG 108.79 | 22 | 58 | 0.48 | 1541 | 45.2 | This study |
| G. sulphuraria SAG 108.79 | 42.8 | 58 | 0.52 | 1703 | 29.9 | This study |
| G. sulphuraria | 24 | | 0.5 | 696-2400 (calc) | 29-100 | WO 2017/050917 A1 |

TABLE 5B

Further Comparison of Phycocyanin Production Methods

| Strain | Reactor | Trophic state | Carbon source | Scale (L) | Culture period (Days) | Light ($\mu mol \cdot m^{-2} \cdot s^{-1}$) | $O_2$ range (mean) (%) | $S_0$ ($g \cdot L^{-1}$) |
|---|---|---|---|---|---|---|---|---|
| G. sulphuraria 074G | STR; semi-continuous | Hetero-trophic | Glucose, fructose, sucrose | 2.5 | 10 | 20-30 | Not reported | 5; 5-500 |
| G. sulphuraria 074G-G2 | STR; continuous | Hetero-trophic | D-Glucose | 2.5 | 17 | — | Not reported | 50; 50-150 |
| G. sulphuraria UTEX # 2919 | Stirred tank reactor | Mixo-trophic | Glycerol | 2 | 16 | 150-300 | 5-30% | 30 |
| G. sulphuraria ACUF141 | Stirred tank Reactor | Hetero-trophic | Glycerol | 2 | 17 | — | 100; 50; 35 | 20 |
| G. sulphuraria ACUF141 | Airlift; semi-continuous | Hetero-trophic | Glycerol | 4.0-5.0 | 7 | — | 100-50 (90) | 20 |
| G. sulphuraria ACUF141 | Airlift; continuous | Hetero-trophic | Glycerol | 4 | 20 | — | 100-75 | 10.5-130 |
| G. sulphuraria ACUF141 | Airlift; continuous | Hetero-trophic | Glucose; fructose; sucrose | 4 | 27 | — | 100-65 | 200; 200; 200 |

| Strain | $\mu/D$ (day$^{-1}$) | $P_X$ ($g \cdot L^{-1} \cdot$ day$^{-1}$) | $X_{Final}$ ($g \cdot L^{-1}$) | $Y_{x/s}$ | $P_{cpc}$ (mg $\cdot L^{-1} \cdot$ day$^{-1}$) | $Y_{x/cpc}$ (mg $\cdot g^{-1}$) | Figure/reference |
|---|---|---|---|---|---|---|---|
| G. sulphuraria 074G | 1.01-1.1 | n.d. | 72-100 | 0.46-0.54 | n.d. | 8.00-18.0 | (Sloth et al., 2006) |
| G. sulphuraria 074G-G2 | 0.6 | 14.6-50 | 24.4-83.3 | 0.43 | 163-861 | 15.6 | (Graverholt and Eriksen, 2007) |
| G. sulphuraria UTEX # 2919 | 0.6 | 24 | | 0.5 | 696-2400 (calc) | 29-100 | WO 2017/050917 A1 |
| G. sulphuraria ACUF141 | 0.45 | 4.1 | 9.1 | 0.45 | 45 | 11.3 | FIG. 1 |
| G. sulphuraria ACUF141 | 0.8 | 22.1 | 58 | 0.48 | 1188 | 13.8-45.2 | FIG. 3 |
| G. sulphuraria ACUF141 | 0.6, 0.7 | 32.3-40.5 | 59.6 | 0.44-0.45 | 1150, 1560 | 31.9-41.0 | FIG. 4 |
| G. sulphuraria ACUF141 | 0.54; 0.79; 0.6 | 40.8; 72.4; 45.9 | 75.9; 91.1; 76.4 | 0.38; 0.46; 0.38 | 1796; 1767; 1540 | 44.2; 24.4; 33.8 | FIG. 6 |

As demonstrated by Table 5A and B, as well as the data presented thus far, our strategy for producing phycocyanin from *Galdieria sulphuroria* by ensuring high oxygen saturation, inaccessible in a stirred tank system, is able to generate far superior productivities in heterotrophic modes.

Under continuous conditions we are able to generate over 1.7 g·L$^{-1}$·day$^{-1}$ using glycerol (FIG. 4 or 17), and over 1.75 g·L$^{-1}$·day$^1$ using glucose (FIG. 20), compared to a literature high of 0.86 g·L$^{-1}$·day$^{-1}$ using glucose (Graverholt and Eriksen, 2007). Indeed, these data are at least comparable, if not superior to processes requiring additional illumination to a stirred tank reactor (WO 2017/050917 A1), which only achieved a biomass productivity of 24 g·L$^{-1}$·day$^{-1}$ compared to our 42 g·L$^{-1}$·day$^1$, and an estimated phycocyanin productivity between 0.7-2.4 g·L$^{-1}$·day$^1$.

These data present a 567 times higher phycocyanin productivity compared to existing, industrial *spirulina*-based open pond technology (Jimenez et al., 2003), and at least 20 times improvement over even the most generous mixotrophic bioreactor based *spirulina* cultivation (Chen and Zhang, 1997).

Ammonium and pH Control for Production of Phycocyanin from *Galdieria* e) pH Changes as Nitrogen Taken Up

Figures 7A, 7B, 7C:
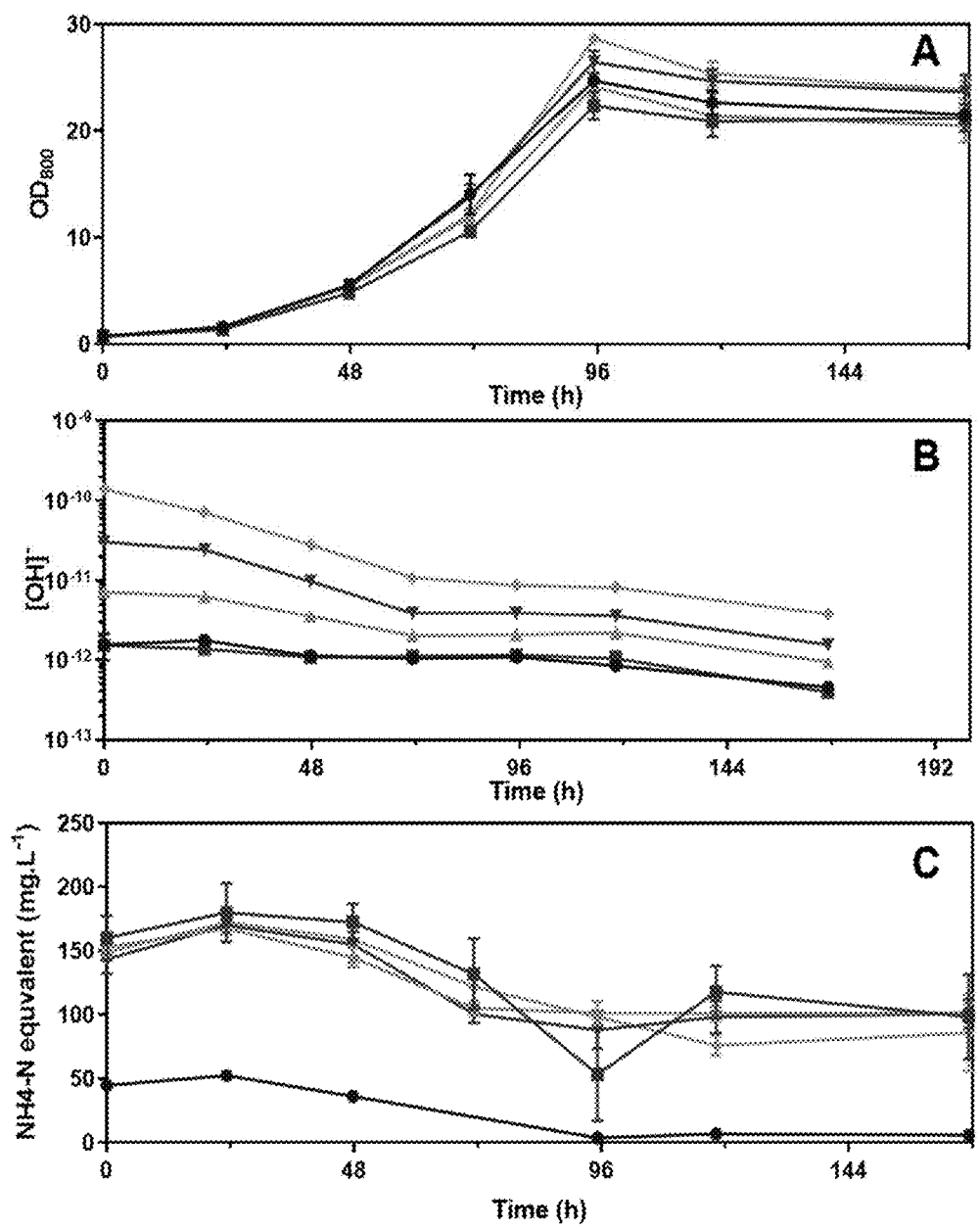

FIG. 6 and FIG. 7 demonstrate the relationships between growth, low pH and nitrogen uptake of *Galdieria* cultivations. Flask cultures were grown heterotrophically at 42° C. in the dark in a water bath with 20 g·L$^{-1}$ glucose as the growth limiting substrate. pH and medium nitrogen was measured throughout the experiment, and cultures additionally contained glycyl-glycine as a pH buffer. In FIG. 6, the concentration of protons added to the medium during cultivation correlates with the intracellular phycocyanin concentration, suggesting a relationship between protein production and acidification of the medium. Replicate cultures were grown at different initial pH values, with the controls at pH 2.0. Higher initial pH reduced the overall acidification of the medium, correlating with reduced phycocyanin production, despite no significant effect of growth rate as observed in FIG. 7A.

It is unclear why an increased pH would inhibit the uptake of nitrogen and subsequent release of protons into the medium. It may be that the acid in the medium acts with the uptake transporter to promote nitrogen uptake, although no mechanism for this is observed at this time. The implications of reducing phycocyanin expression lead to cultivation processes requiring more tightly controlled pH values.

f) Large amounts of nitrogen needed to produce phycocyanin

Studies into optimising carbon—C:N ratios for *Galdieria* identified the greatest phycocyanin productivity occurring at a ratio between $10^{-1}$5:1 C:N, with impaired productivity at higher ratios (Sloth et al., 2006). As such, to support high density culture, extremely solute rich feeding solutions are required—a 500 $g \cdot L^{-1}$ glucose based feeding solution required 110 $g \cdot L^{-1}$ ammonium sulphate (Graverholt and Eriksen, 2007), as well as other inorganic components. These amounts are very close to solubility limits and require often overnight preparation with heating to fully dissolve.

Turning to glycerol as the carbon source, highly concentrated solutions as above become impossible. Glycerol is hygroscopic, removing non-complexed waterfrom bulk that is required to solvate the large amounts of ammonium sulphate. Ammonium sulphate is not soluble in glycerol. For glycerol therefore, separating the nitrogen source is a requirement, posing a problem to the design of culture systems. In the present invention an automated control system was developed to solve this problem, as described below.

g) Automated Control is Able to Maintain Nitrogen Levels

Further to the above solubility issues in glycerol, *Galdieria*'s cultivation on ammonium leads to significant drop in medium pH. Indeed a typical high density system easily reduces to well below pH 1.0 if uncontrolled, impacting growth rate. There is evidence to suggest that *Galdieria* expresses the AMT ammonium uptake transporter system, which results in a proton being left outside of the cell as the ammonium ion is deprotonated into ammonia, ammonia taken up as a gas through the facilitating transporter, and reprotonated on the inside of the cell (Lamoureux et al., 2010).

By stochiometrically balancing either the amount of protons in a continuous medium, or ensuring an equal pH of feed in batch and fed-batch systems, we were able to maintain stable nitrogen concentrations in the reactor without intervention through an automated control system which automatically responds to pH drop (FIG. 8).

1. Semi-Continuous a) $NH_4OH$

FIG. 9 demonstrates a successful glycerol based cultivation wherein ammonium hydroxide is used to maintain nitrogen levels in the reactor during feeding. Balancing the pH of the feed and reactor is important, as shown by downward trending medium nitrogen throughout the study. It is thought that pH differences between feed (2.0) and bioreactor (1.9) contributed primarily to this reduction, as the feed would exert a diluting effect under semi-continuous conditions. Nevertheless, nitrogen was maintained between 1.4-0.6 $g \cdot L^{-1}$ in the reactor despite rapid growth to high cell density of 75 $g \cdot L^{-1}$ in 6 days and addition of 150 mL 10 M $NH_4OH$ during feeding. This is considerably faster than reported growth in the literature, the highest of which reached 109 $g \cdot L^{-1}$ dry cell weight after 16 days. These data also support the need for high oxygen to promote production of phycocyanin—oxygen reached a low of 28% saturation at day 5.5, and co-ordinates with a reduction of intracellular phycocyanin towards the end of the cultivation to 23 $mg \cdot g^{-1}$. This is similar to reported productivities, the highest of which is 26 $mg \cdot g^{-1}$. The reduction of oxygen in this MK 3 airlift bioreactor revealed problems with the oxygen transport, spurring the construction of the MK 4 airlift reactor with an improved sparger (FIG. 12). That experiment uses $NH_3$ gas, but importantly the oxygen saturation doesn't reduce below 80%, and produced an intracellular phycocyanin of 45 $mg \cdot g^{-1}$ at the final sample.

b) $NH_3$

We found that use of ammonia gas identifies as a more reliable technique of adding basic nitrogen to the system without generating high—pH localised zones due to inadequate mixing, which is particularly important for scalability. FIG. 10 outlines the system setup for this type of control. Instead of a peristaltic pump, a solenoid valve manages ammonia flow into the bioreactor, controlled by a pH sensing computer. FIG. 11 outlines safety characteristics of the automated system. By introducing lockouts for exceptionally high or low pH measurements, addition of ammonia gas into the system is prevented under failure conditions: say the reactor has failed and culture is leaking, at the point that the pH probe is no longer in contact with medium the pH measurement will rise, locking out the system.

By using ammonia gas instead of ammonium hydroxide, two process benefits were observed. Volume inside the reactor is not readily changed by addition of gas, compared to hydroxide solution, simplifying process kinetics. Inadequate mixing is overcome, due to the much larger contact area of gas bubbles compared to a liquid hydroxide tube. As the airlift reactor of the invention has a slower mixing time than a stirred tank in order to prevent excessive shear being exerted on the cells, the high rate of gas exchange in the airlift design may be exploited.

Indeed, the system performed as intended, being able to maintain a stable pH and medium nitrogen concentration between 0.5-1.5 $g \cdot L^{-1}$, despite a total of 43 g of ammonia gas being added over the course of 7 days (FIG. 12). pH is observed to drop at the start of the study until day 3, at which point the ammonia control system was activated, and pH is stabilised.

2. Continuous a) $NH_4OH$

In a continuous system, the relationship between pH and addition of basic nitrogen differs to the semi—continuous systems described above, as acidic cell suspension is leaving the system and must be accounted for. In this case, additional acid is required in the flowing continuous feed to replace that lost from the system. Acid more readily dissolves in glycerol solutions than ammonium sulphate, and has the added benefit of inhibiting contamination of the glycerol, simplifying capital equipment and ensuring sterility. During the experiments presented here, ammonium sulphate has been used to provide an initial nitrogen source upon inoculation. A more optimal strategy further minimising contamination risk, which is highest at the start of cultivation, would be to prepare starter batch medium with a very low pH free of nitrogen, and following inoculation raise the pH with basic nitrogen addition over the course of the first few days.

Using an acid concentration proportional to that of the carbon in the continuous feed, as would be done for nitrogen, ensures the correct stochiometric addition of balance nitrogen to support growth and phycocyanin production in *Galdieria* (Table 1).

FIG. 13 and FIG. 14 provide two examples where the acidic nitrogen-free continuous medium is able to maintained stable nitrogen concentrations in the bioreactor for the cultivation of *Galdieria*. In FIG. 13, nitrogen as well as pH in the reactor is maintained around 5.0 g·L$^{-1}$, except at day 7, where problems with the MK 2 airlift reactor led to some culture loss. FIG. 14 demonstrates an even more stable nitrogen concentration, around 1.0 g·L$^{-1}$, using the MK 4 bioreactor. In this experiment further evidence supporting the high oxygen requirement of phycocyanin is observed, intracellular concentration of which drops from days $9^{-1}1$ at 50% $O_2$. As the air flow rate must be lowered to reduce oxygen saturation in the airlift bioreactor, the mixing has also been affected, leading to a positive feedback effect of excessive glycerol inhibiting cell growth towards the end of the experiment. The baseline glycerol concentration around 10 g·L$^{-1}$ throughout the experiment also causes the overall reduced phycocyanin concentration at 25-30 mg·g$^{-1}$ dry cell weight.

Comparison of Pigments produced in *Galdieria* grown heterotrophically on glycerol compared to autotrophic culture of *Spirulina*

FIG. 15 shows absorbance measurements from pigments extracted in the same way from *Galdieria* (B) grown heterotrophically on glycerol compared with *Spirulina* (A) grown in the traditional autotrophic manner. C-Phycocyanin (CPC) absorbs most strongly at ~620 nm whilst the related protein allophycocyanin (APC) absorbs most strongly at 652 nm. When the two proteins are in a mixture, the characteristic shoulder to the absorbance curve is observed as in (A), demonstrating the resultant absorbance spectrum. Highly purified CPC can be extracted from heterotrophic cultures of *Galdieria* as shown in (B), where no such shoulder is present at 652 nm indicating a lack of allophycocyanin pigment impurity. The *Spirulina* sample contained 2.06 mg·ml-1±0.024 phycocyanin and 0.037 mg·mL−1±0.001 allophycocyanin, whilst the heterotrophic *Galdieria* sample contained 1.72 mg·mL$^{-1}$ phycocyanin and undetectable levels of allophycocyanin having undergone the same purification procedure CARBONE, D. A., OLIVIERI, G.g., POLLIO, A. & MELKONIAN, M. 2020. Biomass and phycobiliprotein production of *Galdieria sulphuroria*, immobilized on a twin-layer porous substrate photobioreactor. *Applied Microbiology and Biotechnology*, 104, 3109-3119.

GRAVERHOLT, 0. S. & ERIKSEN, N. T. 2007. Heterotrophic high-cell-density fed-batch and continuous-flow cultures of *Galdieria sulphuroria* and production of phycocyanin. *Applied Microbiology and Biotechnology*, 77, 69-75.

GRAZIANI, G.g., SCHIAVO, S., NICOLAI, M. A., BUONO, S., FOGLIANO, V., PINTO, G. & POLLIO, A. 2013. Microalgae as human food: chemical and nutritional characteristics of the thermo-acidophilic microalga *Galdieria sulphuroria*. *Food Funct*, 4, 144-52.

GROSS, W., KÜVER, J., TISCHENDORF, G., BOUCHAALA, N. & BOSCH, W. 1998. Cryptoendolithic growth of the red alga *Galdieria sulphuroria* in volcanic areas. *European Journal of Phycology*, 33, 25-31.p KURSAR, T. A. & ALBERTE, R. S. 1983. Photosynthetic Unit Organization in a Red Alga: Relationships between Light-Harvesting Pigments and Reaction Centers. *Plant Physiol*, 72, 409-14.

LAMOUREUX, G., JAVELLE, A., BADAY, S., WANG, S. & BERNECHE, S. 2010. Transport mechanisms in the ammonium transporter family. *Transfus Clin Biol*, 17, 168-75.

MINODA, A., SAKAGAMI, R., YAGISAWA, F., KUROIWA, T. & TANAKA, K. 2004. Improvement of culture conditions and evidence for nuclear transformation by homologous recombination in a red alga, *Cyanidioschyzon merolae* 10D. *Plant Cell Physiol*, 45, 667-71.

RHINE, E. D., MULVANEY, R. L., PRATT, E. J. & SIMS, G. K. 1998. Improving the Berthelot Reaction for Determining Ammonium in Soil Extracts and Water. *Soil Science Society of America Journal*, 62, 473-480.

SLOTH, J. K., WIEBE, M. G. & ERIKSEN, N. T. 2006. Accumulation of phycocyanin in heterotrophic and mixotrophic cultures of the acidophilic red alga *Galdieria sulphuroria*. *Enzyme and Microbial Technology*, 38, 168-175.

LEMASSON, C., TANDEAUD.N & COHENBAZ.G 1973. ROLE OF ALLOPHYCOCYANIN AS A LIGHT-HARVESTING PIGMENT IN CYANOBACTERIA. *Proceedings of the National Academy of Sciences of the United States of America*, 70, 3130-3133.

The invention claimed is:

1. A heterotrophic method of culturing Galdleria sulphuroria algae, comprising:
   (a) Growing Galdleria sulphuroria algae in a medium comprising a carbon source and a nitrogen source, dissolving oxygen in the medium by aeration, and maintaining the oxygen saturation of the medium above 75%.

2. The method according to claim 1, wherein the carbon source comprises a sugar, carbohydrate or polyol, or any combination thereof.

3. The method according to claim 2, wherein the sugar is selected from a monosaccharide, disaccharide, oligosaccharide, polysaccharide or any combination thereof.

4. The method according to claim 2 wherein the polyol is selected from glycerol, erythritol, inositol, lactitol, mannitol, xorbitol, xylitol, or any combination thereof, and wherein the carbohydrate is selected from: isomalt, cellulose, hemicellulose, pectin, starch, glycogen, chitin, chitosan, guar gum, beta-glucan, alginate, acacia gum, beta mannan, inulin, tara gum, xanthan gum, carrageenan gum, polydextrose, glucomannan, or any combination thereof.

5. The method according to claim 1, wherein the carbon source comprises glucose, fructose, sucrose, or glycerol, or any combination thereof.

6. The method according to claim 1, wherein the medium is acidic.

7. The method according to claim 1, wherein the oxygen saturation of the medium is above 80%, above 85%, above 90%, above 95%.

8. The method according to claim 1, wherein at least 50%, at least 55%, at least 60%, at least 65%, at least 70%, at least 75%, at least 80%, at least 85%, at least 90%, at least 95% of the carbon source is glycerol.

9. The method according to claim 8, wherein the glycerol is least 60%, at least 65%, at least 70%, at least 75%, at least 80%, at least 85%, at least 90%, least 95%, at least 99% pure.

10. The method according to claim 1 wherein the method is continuous.

11. The method according to claim 1 wherein the temperature of the medium is between 35 to 55° C.

12. The method according to claim 1, wherein the method further comprises a step of collecting algal biomass from the culture medium.

13. The method according to claim 1, wherein the method produces between 35 and 45 $g \cdot L^{-1} \cdot day^{-1}$ of algal biomass.

14. A method of producing phycocyanin comprising culturing Galdleria sulphuroria algae according to the method of claim 1.

15. The method according to claim 12, wherein the algal biomass has a mean intracellular concentration of phycocyanin of between 25-50 $mg \cdot g^{-1}$ dry cell weigh.

16. The method according to claim 14, wherein the method produces between 1-2.5 $g \cdot L^{-1} \cdot day^{-1}$ of phycocyanin.

17. Algal biomass produced by the method of claim 1.

18. The algal biomass according to claim 17 having a mean intracellular concentration of phycocyanin of at least 25 $mg \cdot g^{-1}$ dry cell weight and a mean intracellular concentration of allophycocyanin of less than 1.0 $mg \cdot g^{-1}$ dry cell weight.

\* \* \* \* \*